United States Patent
Peng

(10) Patent No.: US 6,959,436 B2
(45) Date of Patent: Oct. 25, 2005

(54) APPARATUS AND METHODS FOR INTELLIGENTLY PROVIDING APPLICATIONS AND DATA ON A MOBILE DEVICE SYSTEM

(75) Inventor: Luosheng Peng, San Jose, CA (US)

(73) Assignee: InnoPath Software, Inc., Alviso, CA (US)

( * ) Notice: Subject to any disclaimer, the term of this patent is extended or adjusted under 35 U.S.C. 154(b) by 625 days.

(21) Appl. No.: 09/737,927

(22) Filed: Dec. 15, 2000

(65) Prior Publication Data

US 2002/0078209 A1 Jun. 20, 2002

(51) Int. Cl.[7] .......................................... G06F 15/163
(52) U.S. Cl. ...................................................... 719/310
(58) Field of Search ........................................ 719/310

(56) References Cited

U.S. PATENT DOCUMENTS

| | | | | |
|---|---|---|---|---|
| 5,218,602 A | * | 6/1993 | Grant et al. ................. | 370/390 |
| 5,721,908 A | * | 2/1998 | Lagarde et al. ................ | 707/10 |
| 5,886,698 A | * | 3/1999 | Sciammarella et al. ...... | 345/769 |
| 5,983,281 A | * | 11/1999 | Ogle et al. ................... | 709/249 |
| 5,999,740 A | * | 12/1999 | Rowley ........................ | 717/173 |
| 6,009,467 A | * | 12/1999 | Ratcliff et al. ............... | 709/224 |
| 6,047,357 A | * | 4/2000 | Bannon et al. .............. | 711/133 |
| 6,389,422 B1 | * | 5/2002 | Doi et al. ...................... | 707/10 |
| 6,493,871 B1 | * | 12/2002 | McGuire et al. ............. | 717/173 |
| 6,539,382 B1 | * | 3/2003 | Byrne et al. ................... | 707/10 |

* cited by examiner

*Primary Examiner*—Meng-Al T. An
*Assistant Examiner*—LeChi Truong
(74) *Attorney, Agent, or Firm*—PatentEsque Law Group, LLP; Roxana H. Yang

(57) ABSTRACT

An exemplary method for intelligently providing application and data in a mobile device system comprises the steps of collecting user operation history of at least one user, generating user and application registration information, selectively caching application or data at a mobile device and a gateway based on the user operation history, differentially updating the application or data at the mobile device and the gateway, and synchronizing the user operation history and user and application registration information among a plurality of gateways.

36 Claims, 17 Drawing Sheets

APPARATUS AND METHODS FOR INTELLIGENTLY PROVIDING APPLICATIONS AND DATA ON A MOBILE DEVICE SYSTEM

FIELD OF THE INVENTION

This invention relates to apparatus and methods for intelligently providing applications and data on a mobile device system. In particular, this invention relates to apparatus and methods for intelligently providing rich media on a mobile device system.

BACKGROUND OF THE INVENTION

Computer devices connected by a network are typically capable of sharing information. In a world wide network, such as the Internet, client computers or devices connected to the network are capable of accessing information stored in virtually any server computers connected to the network. Many modem server computers provide rich media that are accessible across the Internet. Examples of rich media are audio, video, image, software, applications, games, data, and other multimedia information.

Typically, transmission of rich media across the Internet requires a wide bandwidth. Further, the cost and efficiency for a user to retrieve rich media is dependent on the capacity of the user's computer or device. Partly due to size constraints, most existing wireless/mobile devices do not have the capacity to effectively retrieve rich media. In particular, most wireless/mobile devices have very limited memory space for caching and inadequate processing capability for retrieving complex objects.

Generally, wireless/mobile devices include a micro-browser pre-installed on a wireless/mobile device and a set of fixed applications and hierarchical menus for Internet access. Using the micro-browser, a user typically browses the Internet using the fixed menus or by manually entering specific uniform resource locators (URLs). Such fixed menus are not tailored to a user's preferences.

One possible solution to more efficiently provide rich media on wireless/mobile devices is to provide devices that are capable of implementing Java applications. Java applications are created by the Java language developed by Sun Microsystem®. Typically, successful implementations of Java applications on wireless/mobile devices can provide users with better user-interface, security, and rich media access. In general, providing rich media on wireless/mobile devices, such as by implementing Java applications, requires using wireless/mobile devices that have greater memory capacity, better processing capabilities, as well as more efficient applications/data management.

In addition to improving wireless/mobile devices, inefficiencies in gateways that connect the wireless/mobile devices to the servers on the Internet should also be addressed. In existing systems, subscriber and/or user profile information stored on a gateway is generally only partially synchronized or not synchronized in real time with other gateways. As a result, gateways are typically not completely redundant and scalable. In systems having no synchronization or only partial synchronization of information, when an original gateway crashes, a user has to wait until the original gateway recovers from the crash to regain service. Even if a system allows automatic routing to a nearby gateway when an original gateway crashes, in systems that do not synchronize information in real time, the quality of service varies from gateway to gateway because some information may not be available at such nearby gateways. In addition, when gateways are not synchronized in real time, load balancing among the gateways is difficult and inefficient, thus likely to result in frequent gateway crashing.

Thus, it is desirable to provide apparatus and methods for providing intelligent applications/data management in mobile device systems. It is further desirable to provide apparatus and methods to efficiently synchronize gateways in mobile device systems.

SUMMARY OF THE INVENTION

An exemplary method for intelligently providing application and data in a mobile device system comprises the steps of collecting user operation history from at least one user, generating a list of frequently accessed information based on the user operation history, generating user and application registration information, selectively caching information at a mobile device and a gateway based on the list of frequently accessed information, updating the information at the mobile device and the gateway, and synchronizing the user operation history and user and application registration information among a plurality of gateways. In one embodiment, the information that is selectively cached at the mobile device and the gateway includes applications and/or data. In another embodiment, the list of frequently accessed information includes application and or data URLs. In yet another embodiment, the selectively caching step includes the steps of caching a first set of frequently accessed information of each user at a respective mobile device and caching a second set of frequently accessed information at the gateway.

In an exemplary embodiment, the step of updating the information includes the steps of receiving a broadcast about a new version of the information, checking a local cache for an old version of the information, comparing the new version and the old version, and differentially updating portions of the information based on the comparing in response to a user event. For example, the user event includes a user request to execute or access the old version. In another exemplary embodiment, the step of updating the information includes the steps of performing a status check with a server, downloading a new version from the server if the new version exists, and replacing an old version with the new version. In one embodiment, the step of performing a status check includes the step of triggering the status check in response to a user event. In another embodiment, the step of performing a status check includes the step of automatically triggering the status check in accordance with an estimated update interval. In yet another exemplary embodiment, the step of updating the information includes the steps of receiving a broadcast about a new version of the information, checking a local cache at the gateway for an old version of the information, comparing the new version and the old version, generating a differential file based on the comparing, and sending the differential file to the mobile device.

In one embodiment of the exemplary method, the step of updating the information includes the steps of downloading a new version of the information from a server and checking a local cache at the gateway for an old version of the information. Such that, if the local cache includes the old version, the old version is compared to the new version, a differential file is generated based on the comparing, and the differential file is sent to the mobile device. On the other hand, if the local cache does not include the old version, the new version is directly sent to the mobile device. In an exemplary embodiment, the step of downloading a new version includes the step of triggering the downloading in response to a schedule. In another exemplary embodiment, the step of downloading a new version includes the step of automatically triggering the downloading in accordance with an estimated update interval.

In another embodiment of the exemplary method, the information is synchronized by the steps of inquiring a plurality of potential slave gateways about their availability for a synchronization process, receiving responses from the plurality of potential slave gateways, initiating the synchronization process if all of the plurality of potential slave gateways are available, and repeating the inquiring if not all of the plurality of potential slave gateways are available.

In yet another embodiment, the exemplary method further comprises the steps of monitoring activity at the mobile device and the gateway and automatically routing the mobile device to another gateway when the gateway is overloaded, when the gateway crashed, or when a user at the mobile device moved out of an area serviced by the gateway. In one embodiment, the automatically routing step includes the step of routing the mobile device to a geographically nearest functional gateway.

In yet another embodiment, the exemplary method further comprises the steps of saving local information from the mobile device in a temporary cache of the gateway, saving a list of uniform resource locators in a database of the gateway, and transferring the local information and a copy of the list to a new mobile device upon receiving an initiation request from the new mobile device. In one embodiment, a local cache at the gateway is checked for an application or data corresponding to items on the list of uniform resource locators. If the application or data is found in the local cache, the application or data is sent to the new mobile device. If the application or data is not found in the local cache, the application or data is downloaded from a server and then sent to the new mobile device.

In one embodiment, the exemplary method further comprises the steps of receiving a request to search for an application or data, the request including keywords, searching the information at the mobile device and the gateway based on the keywords, and generating a result based on the searching.

An exemplary method for generating application requests at a mobile device comprises the steps of determining whether a requested application is located in a local cache, determining whether the requested application in the local cache is current, determining whether an update schedule is executed for the requested application in the local cache, generating an application download request if the requested application is not located in the local cache, generating an application update request if the requested application in the local cache is not current, generating an application status check request if the update schedule is not executed, opening a logical session, opening or reusing a physical session connected to a gateway, and sending the application download request, the application update request, or the application status check request to the gateway via the logical and the physical sessions. In one embodiment, the exemplary method further comprises the steps of searching a user database, collecting user operation history from the user database, and attaching the user operation history to the application download request, the application update request, and the application status check request before sending the requests to the gateway. In another embodiment, the exemplary method further comprises the step of loading the requested application from the local cache if the update schedule is executed.

An exemplary method for processing requests at a gateway comprises the steps of parsing a request, the request including user operation history, building a first intelligent strategy based on the parsing, the first intelligent strategy including at least one database access request, accessing the gateway database, constructing a response based on the accessing, and sending the response to the mobile device. In one embodiment, the step of accessing a gateway database includes the steps of determining whether a requested application or data is located in the gateway and determining whether the requested application or data is current.

In an exemplary embodiment, the exemplary method further comprises the steps of sending the request to a server if the requested application or data is not located in the gateway database or the requested application or data is not current, receiving a server response from the server, building a second intelligent strategy based on the server response, and caching or updating the requested application or data in the gateway in accordance with the second intelligent strategy. In one embodiment, the step of sending the request to a server includes the steps of opening a logical session, opening or reusing a physical session for connection to the server, and sending the request to the server via the logical and physical sessions. In another embodiment, the server response is parsed at the gateway and an acknowledgment is sent to the server if the server response includes any broadcast message.

Yet another exemplary method for providing application and data in a mobile device system comprises the steps of sending a schedule for updating an application, periodically updating the application to obtain an updated application, sending a broadcast message about the updated application, receiving a request to update the application, comparing the application to the updated application to obtain a differential file, and sending the differential file in response to the request.

An exemplary computer program product for intelligently providing application and data in a mobile device system comprises logic code for collecting user operation history from at least one user, logic code for generating user and application registration information, logic code for generating a list of frequently accessed information based on the user operation history, logic code for selectively caching information at a mobile device and a gateway based on the list of frequently accessed information, logic code for updating the information at the mobile device and the gateway, and logic code for synchronizing the user operation history and the user and application registration information among a plurality of gateways. In one embodiment, the logic code for selectively caching includes logic code for caching a first set of frequently accessed information of each user at a respective mobile device and logic code for caching a second set of frequently accessed information at the gateway.

In an exemplary embodiment, the logic code for updating the information includes logic code for receiving a broadcast about a new version of the information, logic code for checking a local cache for an old version of the information, logic code for comparing the new version and the old version, and logic code for differentially updating portions of the information based on the comparing in response to a user event. In another exemplary embodiment, the logic code for updating the information includes logic code for performing a status check with a server, logic code for downloading a new version from the server if the new version exists, and logic code for replacing an old version with the new version. In one embodiment, the logic code for performing includes logic code for triggering the status check in response to a user event. In another embodiment, the logic code for performing includes logic code for automatically triggering the status check in accordance with an estimated update interval. In yet another exemplary embodiment, the logic code for updating the information includes logic code for receiving a broadcast about a new version of the information, logic code for checking a local cache at the gateway for an old version of the information, logic code for comparing the new version and the old version, logic code for generating a differential file based on the comparing, and logic code for sending the differential file to the mobile device.

In yet another exemplary embodiment, the logic code for updating the information includes logic code for downloading a new version of the information from a server and logic code for checking a local cache at the gateway for an old version of the information. In one embodiment, if the local cache includes the old version, the exemplary computer program product further includes logic code for comparing the old version and the new version, logic code for generating a differential file based on the comparing, and logic code for sending the differential file to the mobile device. In another embodiment, if the local cache does not include the old version, the exemplary computer program product further includes logic code for sending the new version to the mobile device.

In one embodiment, the logic code for downloading a new version includes logic code for triggering the downloading in response to a schedule. In another embodiment, the logic code for downloading a new version includes logic code for automatically triggering the downloading in accordance with an estimated update interval.

In an exemplary embodiment, the logic code for synchronizing the information includes logic code for inquiring a plurality of potential slave gateways about their availability for a synchronization process, logic code for receiving responses from the plurality of potential slave gateways, logic code for initiating the synchronization process if all of the plurality of potential slave gateways are available, and logic code for repeating the inquiring if not all of the plurality of potential slave gateways are available.

In another exemplary embodiment, the exemplary computer program product further comprises logic code for monitoring activity at the mobile device and the gateway and logic code for automatically routing the mobile device to another gateway when the gateway is overloaded, when the gateway crashed, or when a user at the mobile device moved out of an area serviced by the gateway. In one embodiment, the logic code for automatically routing includes logic code for routing the mobile device to a geographically nearest functional gateway.

In yet another exemplary embodiment, the exemplary computer program product further comprises logic code for saving local information from the mobile device in a temporary cache of the gateway, logic code for saving a list of uniform resource locators in a database of the gateway, and logic code for transferring the local information and a copy of the list to a new mobile device upon receiving an initiation request from the new mobile device. In one embodiment, the exemplary computer program product further includes logic code for checking a local cache at the gateway for an application or data corresponding to items on the list of uniform resource locators, logic code for sending the application or data to the new mobile device if the application or data is found in the local cache, logic code for downloading the application or data from a server if the application or data is not found in the local cache, and logic code for sending the application or data downloaded from the server to the new mobile device.

In one embodiment, the exemplary computer program product further comprises logic code for receiving a request to search for an application or data, the request including keywords, logic code for searching the information at the mobile device and the gateway based on the keywords, and logic code for generating a result based on the searching.

An exemplary computer program product for generating application requests at a mobile device comprises logic code for determining whether a requested application is located in a local cache, logic code for determining whether the requested application in the local cache is current, logic code for determining whether an update schedule is executed for the requested application in the local cache, logic code for generating an application download request if the requested application is not located in the local cache, logic code for generating an application update request if the requested application in the local cache is not current, logic code for generating an application status check request if the update schedule is not executed, logic code for opening a logical session, logic code for opening or reusing a physical session connected to a gateway, and logic code for sending the application download request, the application update request, or the application status check request to the gateway via the logical and the physical sessions.

In one embodiment, the exemplary computer program product further comprises logic code for searching a user database, logic code for collecting user operation history from the user database, and logic code for attaching the user operation history to the application download request, the application update request, and the application status check request. In another embodiment, the exemplary computer program product further comprises logic code for loading the requested application from the local cache if the update schedule is executed.

An exemplary computer program product for processing requests at a gateway comprises logic code for parsing a request, the request including user operation history, logic code for building a first intelligent strategy based on the parsing, the first intelligent strategy including at least one database access request; logic code for accessing the gateway database, logic code for constructing a response based on the accessing, and logic code for sending the response to the mobile device.

In one embodiment, the logic code for accessing a gateway database includes logic code for determining whether a requested application or data is located in the gateway, and logic code for determining whether the requested application or data is current. In another embodiment, the exemplary computer program product further comprises logic code for sending the request to a server if the requested application or data is not located in the gateway database or the requested application or data is not current, logic code for receiving a server response from the server, logic code for building a second intelligent strategy based on the server response, and logic code for caching or updating the requested application or data in the gateway in accordance with the second intelligent strategy. In an exemplary embodiment, the logic code for sending the request to a server includes logic code for opening a logical session, logic code for opening or reusing a physical session for connection to the server, and logic code for sending the request to the server via the logical and physical sessions. In yet another embodiment, the exemplary computer program product further comprises logic code for parsing the server response and logic code for sending an acknowledgment to the server if the server response includes any broadcast message.

Yet another exemplary computer program product for providing application and data in a mobile device system comprises logic code for sending a schedule for updating an application, logic code for periodically updating the application to obtain an updated application, logic code for sending a broadcast message about the updated application, logic code for receiving a request to update the application, logic code for comparing the application to the updated application to obtain a differential file, and logic code for sending the differential file in response to the request.

DETAILED DESCRIPTION OF THE INVENTION

Figure 1:
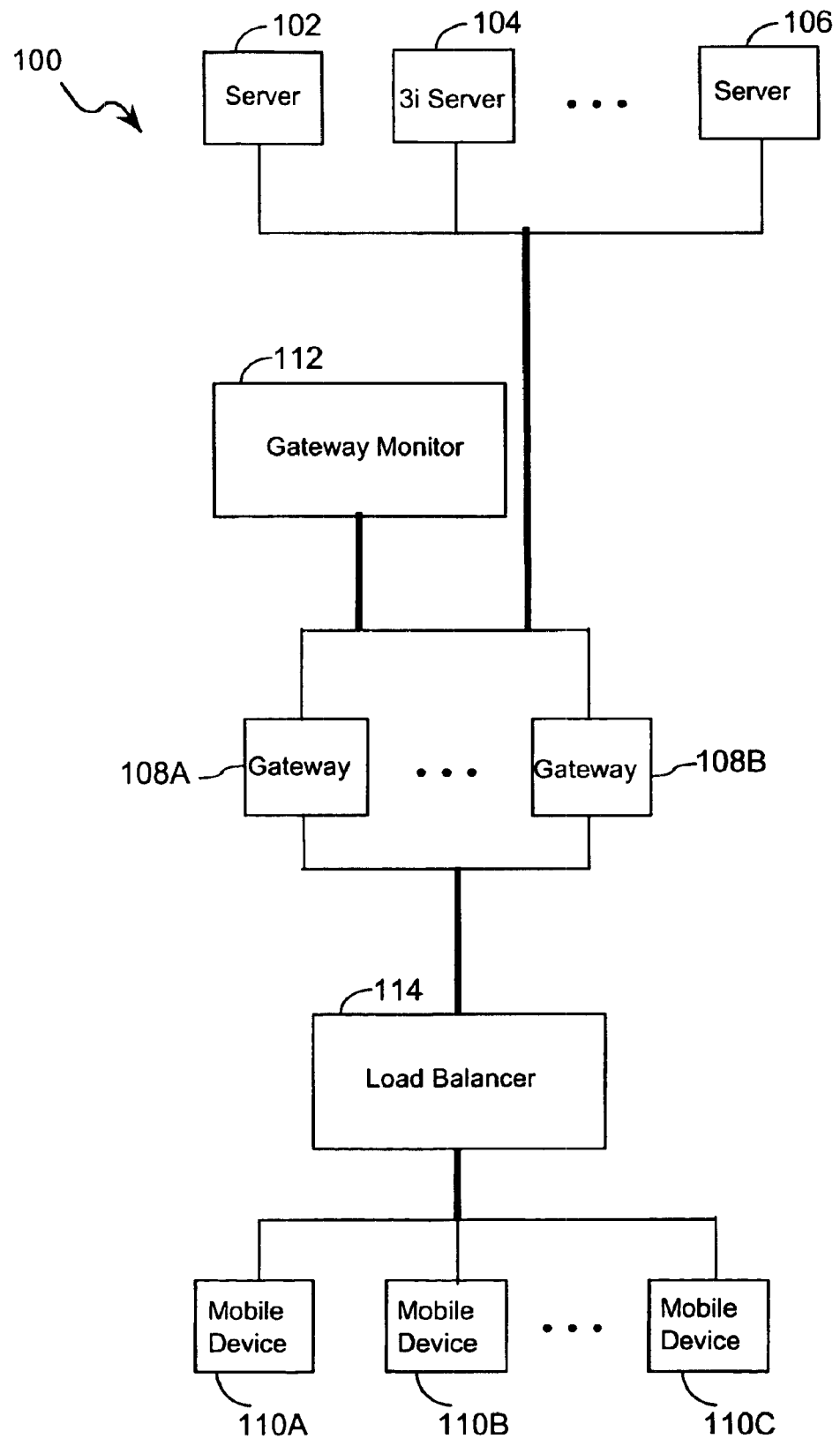
FIG. 1 schematically illustrates an exemplary system in accordance with an embodiment of the invention.

FIG. 1 illustrates an exemplary system 100 in accordance with an embodiment of the invention. The system 100 includes multiple servers connected to multiple gateways that service multiple mobile devices. For ease of explanation, only a representative number of servers, gateways, and mobile devices are shown in FIG. 1. The system 100 includes servers 102–106, gateways 108A–108B, and mobile devices 110A–110C. The server 104 is referred to as a 3i server because it includes an optional software that can be installed on any server to improve integration with the rest of the system 100. In an exemplary embodiment, the system 100 also includes a gateway monitor 112 and a load balancer 114.

Figure 2A:
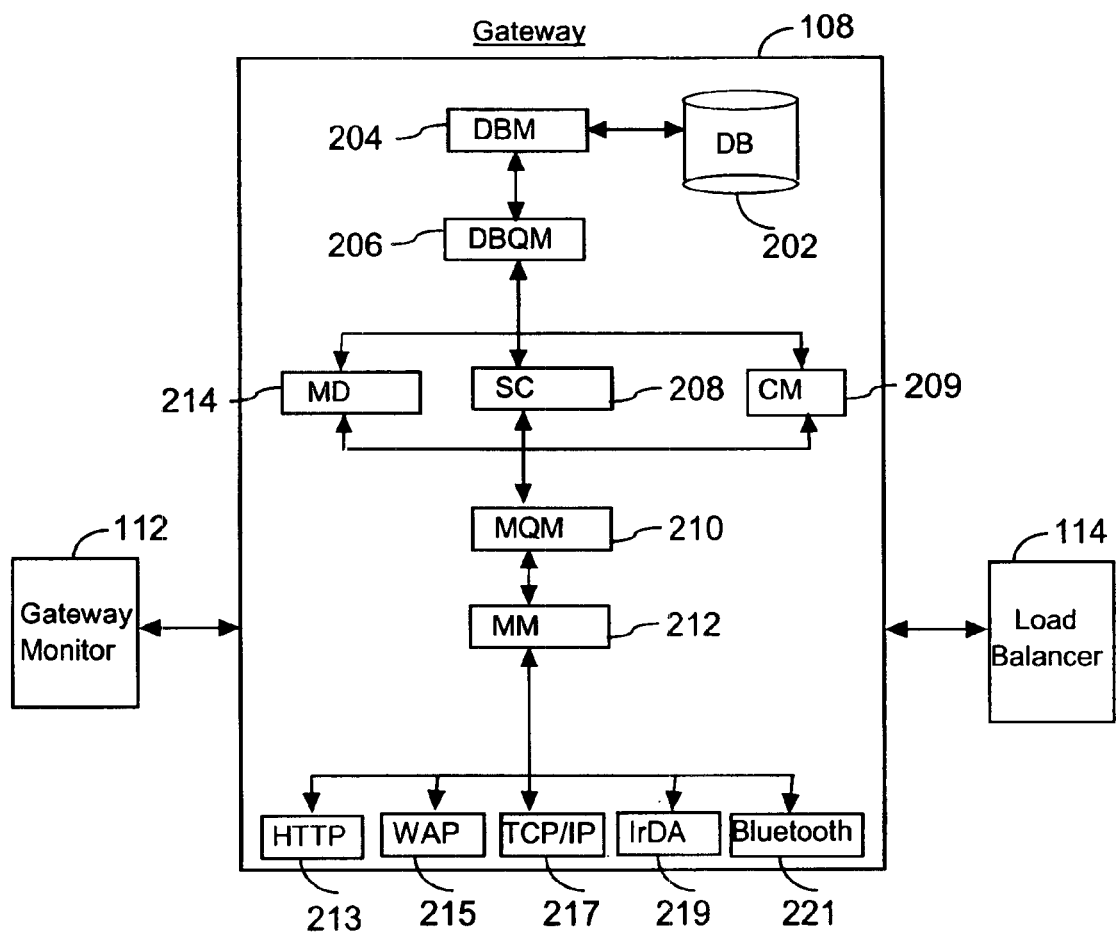
FIG. 2A schematically illustrates an exemplary gateway in accordance with an embodiment of the invention.

FIG. 2A illustrates an exemplary gateway 108 in accordance with an embodiment of the invention. In an exemplary embodiment, the gateway 108 includes a gateway database (DB) 202, a gateway database middleware (DBM) 204, a database queue manager (DBQM) 206, a gateway directory (MD) 214, a gateway smart connectivity module (SC) 208, a cache manager (CM) 209, a message queue manager (MQM) 210, a messaging middleware (MM) 212, and a communication transport group including HTTP 213, wireless application protocol (WAP) 215, TCP/IP 217, infrared data association (IrDA) 219, Bluetooth 221, and other transports or protocols.

In an exemplary embodiment, the gateway 108 is functionally connected to the gateway monitor 112 and the load balancer 114.

The gateway DB 202 is a gateway database management system. In an exemplary embodiment, the gateway DB 202 is a third party product such as Oracle 8i by Oracle. The gateway DBM 204 contains the API to the gateway DB 202 and the API may be implemented by using third party product such as Enterprise Database Access (EDA) by Information Builder or Vortex by TriFox. In an exemplary embodiment, the gateway DBM 204 functions to isolate the DBQM 206 from any difference among database management systems. The DBQM 206 provides a set of queues for database access. The DBQM 206 maintains logical sessions and physical sessions for connection to the gateway DB 202 and coordinates the sessions. In an exemplary embodiment, the DBQM 206 maintains load balance of database access and optimizes database response time.

The gateway MD 214 maintains user operation history, performs intelligent application searches, and manages logical sessions. In an exemplary embodiment, the gateway MD 214 supports multi-threading with each thread implemented as an independent process. The gateway MD 214 maintains user operation history by uploading user operation history from mobile devices 110, caching the user operation history in the gateway DB 202, and removing out-of-date information from the gateway DB 202. The gateway MD 214 performs intelligent application searches by using keywords provided by a user and user operation history to optimize any search request.

The gateway SC 208 provides intelligent caching of applications/data, applications/data management, facilitates transfer of application/data for initialization of new mobile devices, and logical session management. In an exemplary embodiment, the gateway SC 208 supports multi-threading with each thread implemented as an independent process. For providing intelligent caching, the gateway SC 208 tracks user application/data download and update histories, calculates and maintains a cache benefit index (CBI) for each application/data, and selects a subset of application/data that are to be maintained in the gateway DB 202 based on the above. Further, the gateway SC 208 coordinates with the mobile SC 222 (see FIG. 2B). For example, when the gateway SC 208 receives a download, status check, or update request from the mobile device 110, the gateway SC 208 determines operations necessary to respond to the request. In an exemplary embodiment, the gateway SC 208 examines the gateway DB 202 for a copy of any requested application/data and whether such application/data is current. If not, the gateway SC 208 opens a logical session to request a download or update from a server. In addition, the gateway SC 208 processes user requests to save local information and initializes new mobile devices.

The CM 209 updates applications/data cached on the gateway DB 202. In an exemplary embodiment, the CM 209 supports multi-threading with each thread implemented as an independent process. In an exemplary embodiment, the CM 209 updates cached applications/data based on application update broadcasts (from servers), application release schedules (also from servers), and its own calculated update intervals. In one embodiment, the CM 209 estimates application update frequencies and update intervals for each application.

The gateway MM 212 contains the API to the communication transport group. The gateway MM 212 isolates the gateway MD 214, gateway SC 208, and the CM 209 from any difference among transports and protocols. Further, the gateway MM 212 maintains logical sessions and physical sessions for connection to the servers 102–106 and/or the mobile device 110. The MQM 210 provides a set of queues for Internet or wireless communications. In an exemplary embodiment, the MQM 210 reduces the number of outgoing requests to the same Internet server, prioritizes any outgoing requests, and optimizes the performance and scalability of the servers.

The communication transport group includes standard server and/or wireless communication transports and protocols. The communication transports and protocols as shown in FIG. 2A are not intended to be exhaustive. Rather, as new communication transports or protocols are developed, such new communication transports or protocols can replace any old/obsolete transports or protocols or be simply added to the communication transport group.

Figure 7:
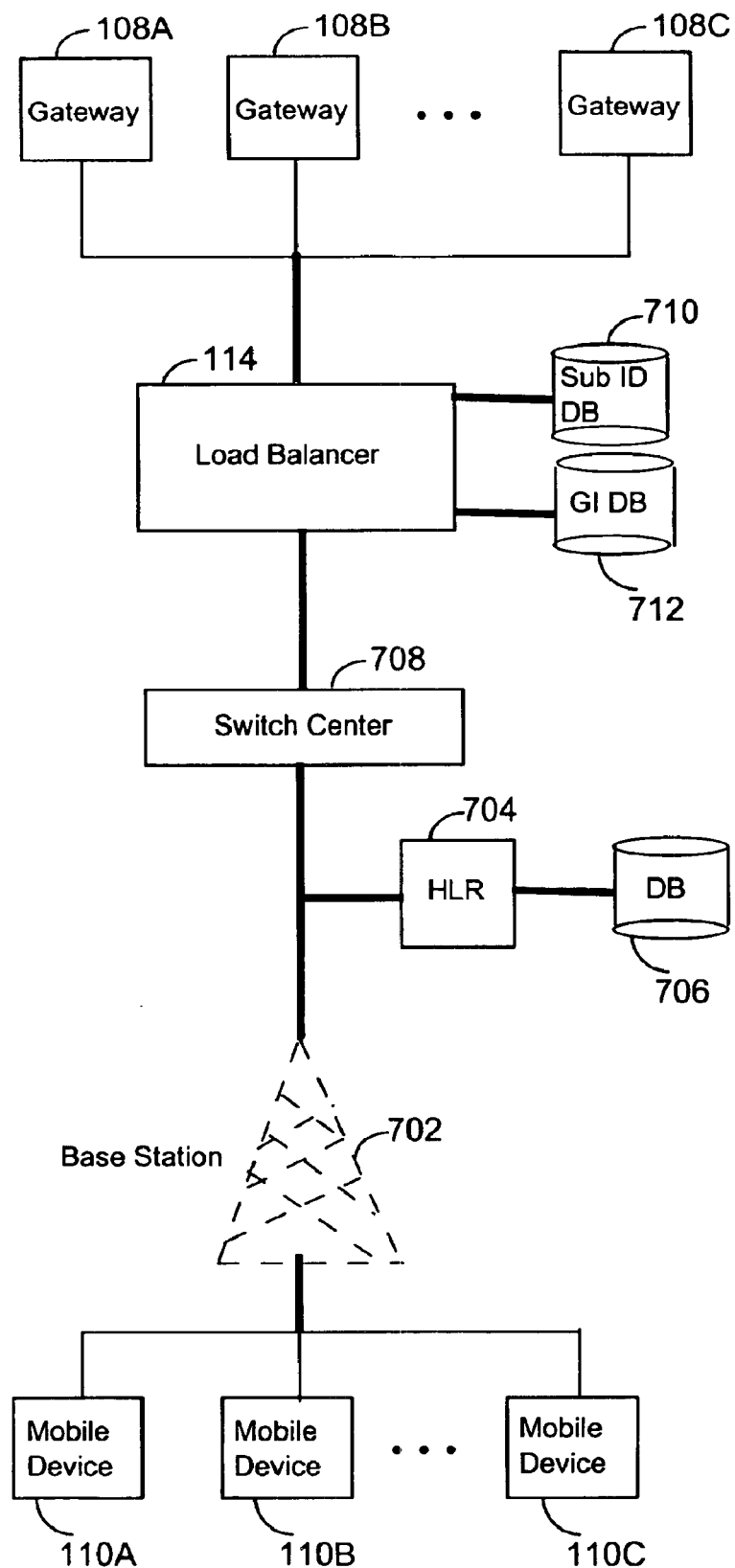
FIG. 7 schematically illustrates an exemplary embodiment of the load balancer in accordance with the invention.

The gateway monitor 112 allows a system administrator to register system information, monitor database access and communication connection activities, and tune system performance. The load balancer 114 monitors wireless communication traffic, user movements, and each gateway CPU/memory payload and provides load balance among gateways 108. In one embodiment, the gateway load balancer 114 tracks user's movements and the total system load to intelligently trigger synchronization among gateways 108. When a gateway 108 becomes overloaded or crashes, the gateway load balancer 114 routes all mobile devices 110 serviced by that overloaded or crashed gateway 108 to the geographically nearest gateway. FIG. 7 below illustrates an exemplary embodiment of the load balancer 114 in more detail.

Figure 2B:
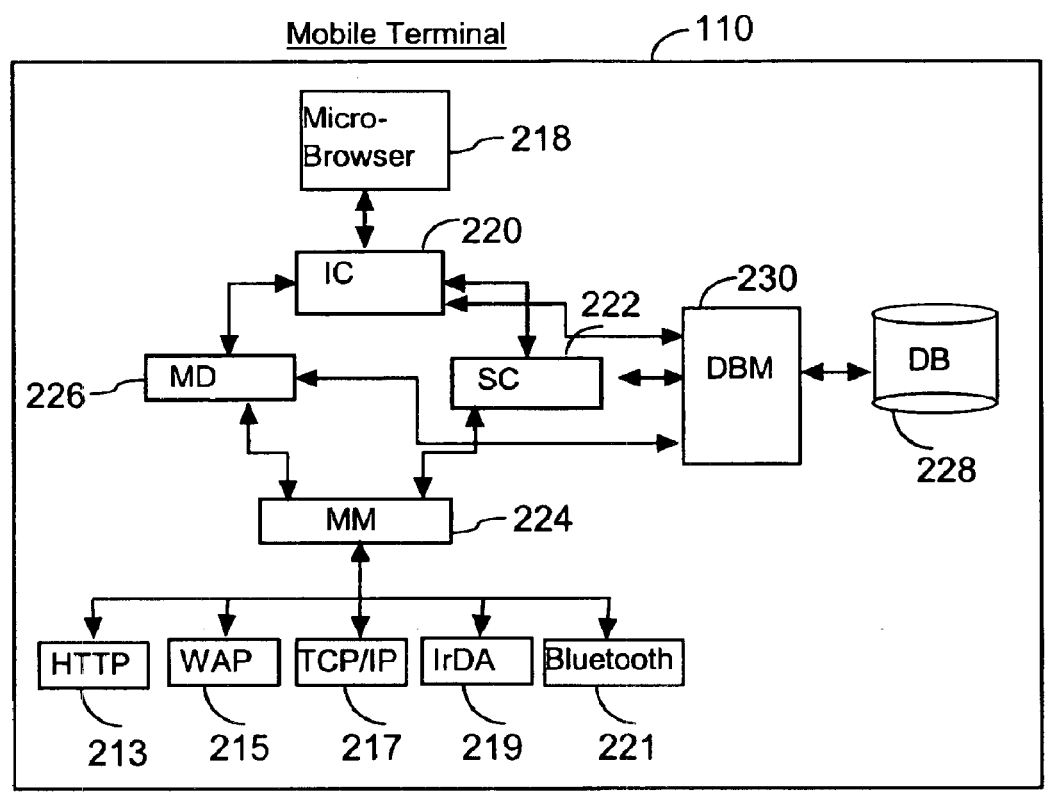
FIG. 2B schematically illustrates an exemplary mobile device in accordance with an embodiment of the invention.

FIG. 2B illustrates an exemplary mobile device 110 in accordance with an embodiment of the invention. The mobile device 110 includes a user interface application, such as a micro-browser (MB) 218, an intelligent user history tracking module (IC) 220, a mobile smart connectivity module (SC) 222, a mobile message middleware (MM) 224, a mobile directory (MD) 226, a database (DB) 228, a database middleware (DBM) 230, and a communication transport group including HTTP 213, WAP 215, TCP/IP 217, IrDA 219, Bluetooth 221, and other transports or protocols.

The IC 220 provides a user interface for tracking user operation history and controls the mobile MD 226 and the mobile SC 222. In an exemplary embodiment, the user interface is a plug-in menu that allows a user to select functions, such as application search, retrieve last search results, retrieve local applications, save, initialization, or other functions. In an exemplary embodiment, the IC 220 tracks and maintains user operation history, including the size of each application or data, the time stamp of each application execution or data access, the frequency of application execution or data access, the frequency of each application or data update, and the average update ratio if an application or data is already cached. The IC 220 initiates the mobile MD 226 and/or the mobile SC 222, depending on the user requested or selected function at the plug-in menu. For example, if a user requests an application search, the IC 220 initiates the mobile MD 226; if the user selects other functions, the IC 220 initiates the mobile SC 222.

The mobile MD 226 coordinates with the gateway MD 214, uploads user operation history, manages logical sessions, and localizes application search when the mobile device 110 is disconnected from the gateway 108. In an exemplary embodiment, the mobile MD 226 receives user input keywords from the IC 220, constructs an application search request, sends the request to the gateway MD 214, receives any search results from the gateway MD 214, and passes the search results to the IC 220. In an exemplary embodiment, before sending an application search request to the gateway MD 214, the mobile MD 226 checks the mobile DB 228 for any user operation history and piggybacks the user operation history to the application search request. In an exemplary embodiment, the mobile MD 226 automatically initiates sending of user operation history even in the absence of any application search request. This automatic initiated sending of user operation history ensures that the information maintained at the gateway 108 is kept current even if the user has not actively connect to the gateway 108 in a long time.

The mobile MD 226 maintains logical sessions and their properties for application searches (e.g., session ID, compression method, and protocol version). For localized application search when the mobile device 110 is disconnected from the gateway 108, the mobile MD 226 searches the mobile DB 228 based on the user inputted keywords received from the IC 220 and provides the user with a back-up solution when the most current solution is unavailable.

The mobile SC 222 performs intelligent caching of applications/data on the mobile device 110, manages cached applications/data, uploads changes on the list of cached applications/data (e.g., newly cached application/data URLs and removed application/data URLs from the local cache), initializes new mobile devices, and manages logical sessions. In an exemplary embodiment, the mobile SC 222 calculates a cache benefit index (CBI) for each application or data and intelligently caches only ones that generate a threshold benefit. Generally, the CBI measures the benefit of caching or updating an application or data. Thus, the larger the CBI, the higher the benefit for caching an associated application or data. In an exemplary embodiment, the CBI for each application is a function of the total download cost (TDC), the total update cost (TUC), the average update percentage (AU %), and the size of the application (S). In one embodiment, the CBI is calculated by the following equation:

$$CBI=(TDC*S)-(TUC*S*AU\ \%).$$

For example, during the day when the stock market is open, the benefit for caching any stock value is very low because the value for each stock continues to fluctuate. At the end of the day when the market is closed, however, the benefit for caching the market closing values of selective stocks is high. To determine which stock value to cache, the mobile SC 222 takes into account each user's operation history. For example, if the user frequently accesses a particular stock's daily value, at the end of the day, the mobile SC 222 coordinates with the gateway SC 208 to cache that stock's closing value on the mobile DB 228.

Typically, some applications or data on a mobile device 110 are local and fixed, thus, should never be removed or updated. Thus, the mobile SC 222 should have the intelligence to recognize the applications or data that can be updated or removed. In addition, the mobile SC 222 should avoid updating or removing any application or data that is currently being executed by the user. In response to a user event, the mobile SC 222 manages applications/data by comparing current applications/data to cached applications/data and updating each when appropriate. For example, user selection of an application or data stored in the mobile DB 228 may trigger the mobile SC 222 to check the status of the application or data before execution or access is allowed.

As part of a process to initiate a new mobile device, the mobile SC 222 at the original mobile device coordinates with the gateway SC 208 to save local applications/data to a temporary cache at the gateway 108 and a list of URLs for the remote applications/data currently cached at the mobile DB 228 to the gateway DB 202. During initialization of the new mobile device, the mobile SC 222 of the new mobile device downloads the local applications/data from the temporary cache at the gateway 108 and the list of URLs for the remote applications/data stored at the original mobile device to the new mobile device. If the gateway 108 has a copy of any of the remote applications/data on the list, such copy is downloaded into the new mobile device. Otherwise, the mobile SC 222 coordinates with the gateway SC 208 to initiate application download processes (described in more detail in FIGS. 4A–4E below) to obtain a copy of those remote applications/data on the list from appropriate servers. In an exemplary embodiment, the mobile SC 222 is also in charge of opening and closing logical sessions for application download, status check, update, save, and initialization requests.

The mobile MM 224 contains the API to the communication transport group.

In an exemplary embodiment, the mobile MM 224 functions to isolate the IC 220, the mobile SC 222, and the mobile MD 226 from operational differences among various transports and protocols in the communication transport group. In one embodiment, the mobile MM 224 maintains logical sessions and physical sessions for connections to a gateway 108 and coordinates the sessions.

The mobile DB 228 is a user database management system. In one embodiment, the mobile DB 228 is a built-in component of an underlying operating system (e.g., micro database management system in EPOC by Symbian or in palmOS by Palm). In another embodiment, the mobile DB 228 is a commercially available product (e.g., Oracle Lite by Oracle) or is specifically developed to be compatible with the rest of the system 100. The mobile DBM 230 contains the API to the mobile DB 228. In an exemplary embodiment, the mobile DBM 230 functions to isolate the IC 220, the mobile SC 222, the mobile MM 224, and the mobile MD 226 from any difference among various database management systems.

Figure 2C:
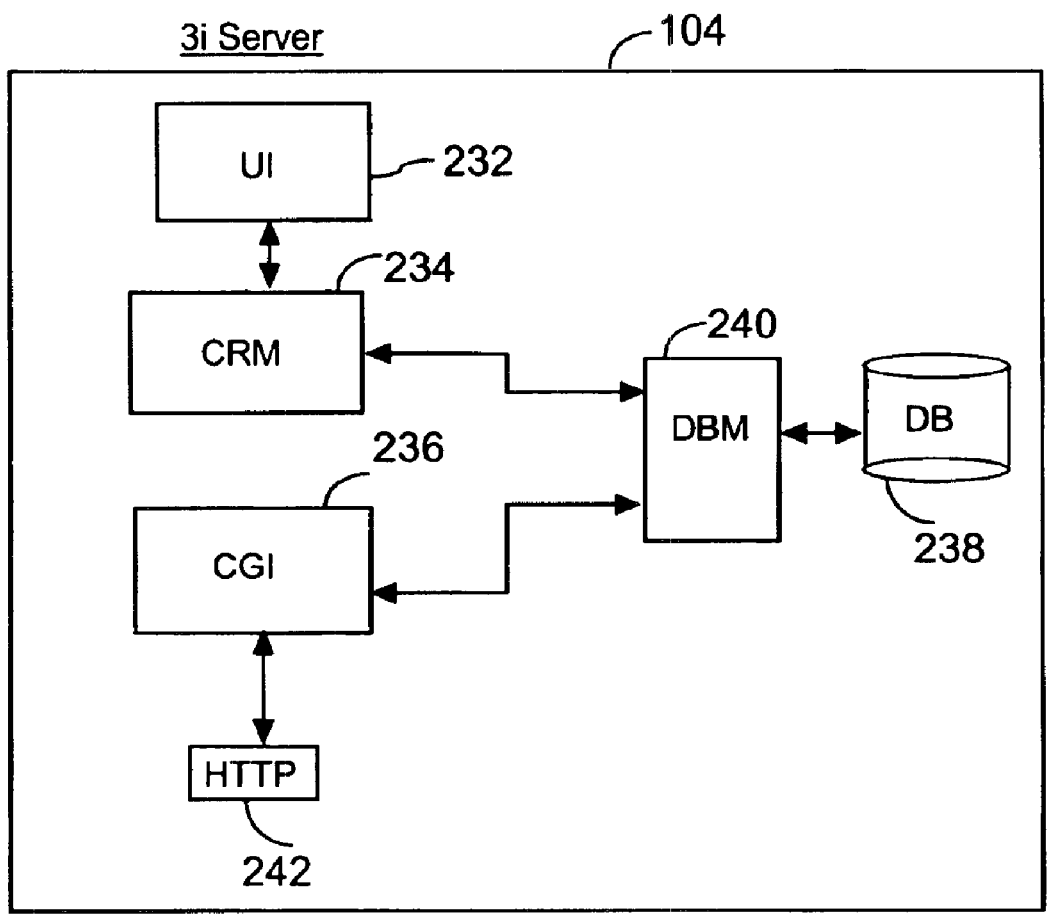
FIG. 2C schematically illustrates an exemplary 3i server in accordance with an embodiment of the invention.

FIG. 2C illustrates an exemplary 3i server 104 in accordance with an embodiment of the invention. The 3i server 104 includes a user interface (UI) 232, a content release manager (CRM) 234, a common gateway interface (CGI) 236, a server database (DB) 238, a server database middleware (DBM) 240, and an HTTP transport 242.

The UI 232 provides a graphical user interface to application release administrators of the 3i server 104. In one embodiment, the UI 232 enables the release of new application versions, schedules for version updates, and application update broadcasts. In another embodiment, the UI 232 supports the registration and an access control list (ACL) of the gateways 108.

The CRM 234 calculates version data of an application and its files, extracts any difference between a new version and an old version of the application, and stores any extracted difference in the server DB 238. In one embodiment, the CRM 234 optimizes content update performance and scalability in the gateway DB 202 and the mobile DB 228. The CGI 236 receives requests from the gateway 108, accesses the server DB 238, generates and sends a response to the gateway 108. For application update broadcasts, the CGI 236 piggybacks broadcast messages in responses to application download, status check, or update requests.

The server DB 238 is the server database management system. In one embodiment, the server DB 238 is a commercially available product (e.g., Oracle 8i by Oracle or SQL server by Microsoft). The server DBM 240 contains the API to the server DB 238. In an exemplary embodiment, the DBM 240 functions to isolate the CRM 234 and the CGI 236 from any difference among database management systems. The HTTP transport 242 is the server transport.

Figure 3A:
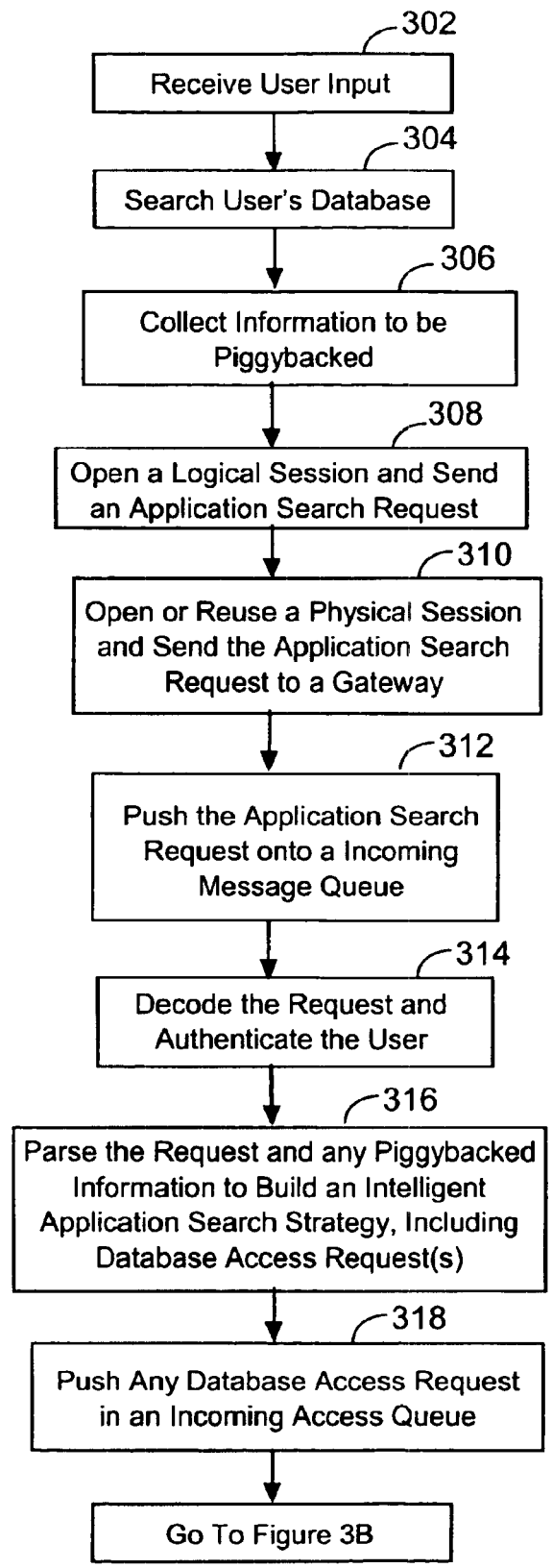
FIGS. 3A and 3B illustrate an exemplary process in accordance with an embodiment of the invention.
Figure 3B:
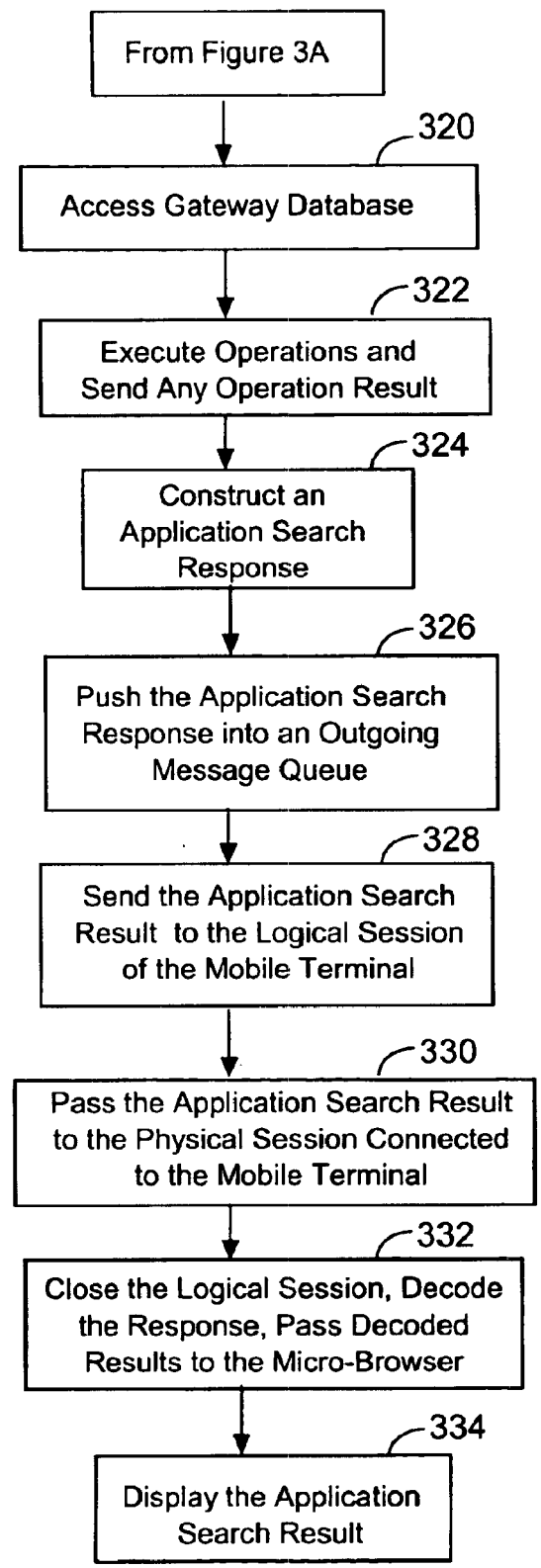

FIGS. 3A–3B illustrate an exemplary process in accordance with an embodiment of the invention. In FIGS. 3A–3B, a user specifies a search request comprising one or more keywords that can be linked by logical operators (e.g., AND, OR, NOT, etc.). In an exemplary embodiment, the keywords and logical operators can be specified by using list menus, voice recognition, electric keyboard, key pads, specific hard or soft keys. In one embodiment, the search request is sent to the gateway 108. In an exemplary embodiment, the gateway 108 maintains an application registration table that contains a list of all applications provided by servers on the network. In one embodiment, the registration table contains the name, brief description, associated keywords, and other information about each application. Similarly, a data registration table is maintained regarding all available data sets. Such tables are continuously and dynamically maintained by the gateway 108 based on information supplied by the servers. When a search request from a mobile device 110 is reviewed at the gateway 108, a personalized match of search results can be obtained based on each user's operation history, user inputted keywords, and a search of the application or data registration tables.

At step 302, a user request for an application search is received. In one embodiment, the micro-browser 218 passes the user request to the IC 220. The IC 220 initiates the mobile MD 226 which searches the mobile DB 228 via the mobile DBM 230 (step 304). Selective user information (e.g., user operation history collected by the IC 220) is collected to be piggybacked to the gateway 108 along with an application search request (step 306). Next, the mobile SC 222 opens a logical session and sends the application search request to the gateway 108 via the mobile MM 224 (step 308). In an exemplary embodiment, the mobile MM 224 opens or reuses a physical session to send the application search request to the gateway MM 212 (step 310). The gateway MM 212 passes the application search request to the MQM 210 which pushes the application search request into an incoming message queue to be serviced in turn by the gateway MD 214 (step 312). Eventually, the gateway MD 214 decodes the request and authenticates the user (step 314). Next, the gateway MD 214 parses the keywords and any piggybacked information in the request to build an intelligent application search strategy (step 316). In an exemplary embodiment, the gateway MD 214 builds an intelligent application search strategy based on user operation history and application/data registration tables.

In an exemplary embodiment, the gateway MD 214 maintains and updates an application selection table and a data access table for each user based on user operation history. In one embodiment, the application selection table and data access table include information such as subscriber ID, application ID, keywords, time stamp, number of application/data execution/access, application/data version, application/data ignoring number, and other user operation history. The application/data ignoring number represents the number of times a user ignores an application or data. In one embodiment, each time a user executes an application, the application ignoring number for that application is reset to 0.

In an exemplary embodiment, the intelligent application search strategy includes at least one database access request to search for any cached frequently accessed applications. The gateway MD 214 then passes the database access request to the DBQM 206 which pushes the database access request into an incoming access queue for gateway DBM 204 (step 318). In an exemplary embodiment, the database access request is placed in the incoming access queue having the highest priority. In an exemplary embodiment, requests (i.e., search requests or otherwise) triggered by a user event always have the highest priority. The process continues in FIG. 3B.

In FIG. 3B, the DBQM 206 eventually services the incoming access queue and accesses the gateway DB 202 (step 320). Any necessary operation is executed in the gateway DB 202 and the results of the operation are sent to the gateway DBM 204 which passes the results to the gateway MD 214 (step 322). In an exemplary embodiment, necessary operations to be executed in the gateway DB 202 are dependent on the type of database management system implemented. For example, necessary operations may include parsing functions and implementing APIs in the database management system to properly locate a desired application. A person skilled in the art would recognize that the operations vary among database management systems.

Based on the database access, if the requested application/data is found, the gateway MD 214 constructs an application search response and passes the response to the MQM 210 (step 324). The MQM 210 pushes the response into an outgoing message queue (step 326). The gateway MM 212 in turn pulls the response from the outgoing message queue and sends it to the logical session (step 328). The response is then passed to the physical session connected to the mobile device 110 (step 330). In an exemplary embodiment, after the response reaches the mobile device 110, the response passes through the mobile MM 224 to the mobile MD 226. The mobile MD 226 closes the logical session, decodes the response, and passes the decoding results to the micro-browser 218 (step 332). The micro-browser 218 displays the results to the user (step 334).

FIGS. 4A–4E illustrate another exemplary process in accordance with an embodiment of the invention. In FIGS. 4A–4E, a user selects an application from a search result or a locally cached list. In response to the selection, the application is updated, retrieved, and uploaded onto the mobile device 10. Such application update and retrieval are transparent to the user. In this embodiment, the selected application or data may be located at the mobile device 110, the gateway 108, or at a server 102–106. For ease of explanation, an application (instead of a data set) is selected. Processes described below are similarly applicable when a user selects a data set.

At step 402, a user's selection of an application from a search result or a locally cached application list is received by the micro-browser 218 at the mobile device 110. The user's selection is recorded (i.e., as part of the user operation history) by the IC 220 (step 404). In response to the application selection, the IC 220 initiates the mobile SC 222. The mobile SC 222 searches the mobile DB 228 via the mobile DBM 224 to locate the selected application and to collect any information (such as the changes on the list of cached application/data) to be piggybacked to the gateway 108 (step 406). If the selected application is not located in the mobile DB 228 (step 408), the mobile SC 222 opens a logical session and sends an application download request to the mobile MM 224 (step 416). Referring back to step 408, if the selected application is located in the mobile DB 228, whether the saved application is out-of-date (or stale) is determined (step 410). If the application is out-of-date, the mobile SC 222 opens a logical session and sends an application update request to the mobile MM 224 (step 418). Referring back to step 410, if the application in the mobile DB 228 is not out-of-date, whether there is a next update schedule and whether such update schedule is out-of-date is determined (step 412). If there is no update schedule or if an update schedule is already out-of-date, the mobile SC 222 opens a logical session and sends an application status check and update request to the mobile MM 224 (step 420). Referring back to step 412, if there is an update schedule and the update schedule is not out-of-date, the mobile SC 222 initiates and uploads the user selected application then passes control back to the micro-browser 218 (step 414).

If a logical session is opened (steps 416, 418 or 420), the mobile MM 224 opens or reuses a physical session and sends the Request (i.e., an application download request, an application update request, or an application status check and update request) to the gateway MM 212 (step 422). In an exemplary embodiment, the mobile MM 224 and the gateway MM 212 communicate in accordance with standard protocols that may require certain fragmentation and reassemble processes. The gateway MM 212 passes the Request to the MQM 210 which pushes the Request into the incoming message queue (step 424). The gateway SC 208 eventually decodes the Request and authenticates the user and the application (step 426). The process continues in FIG. 4B.

Figure 4A:
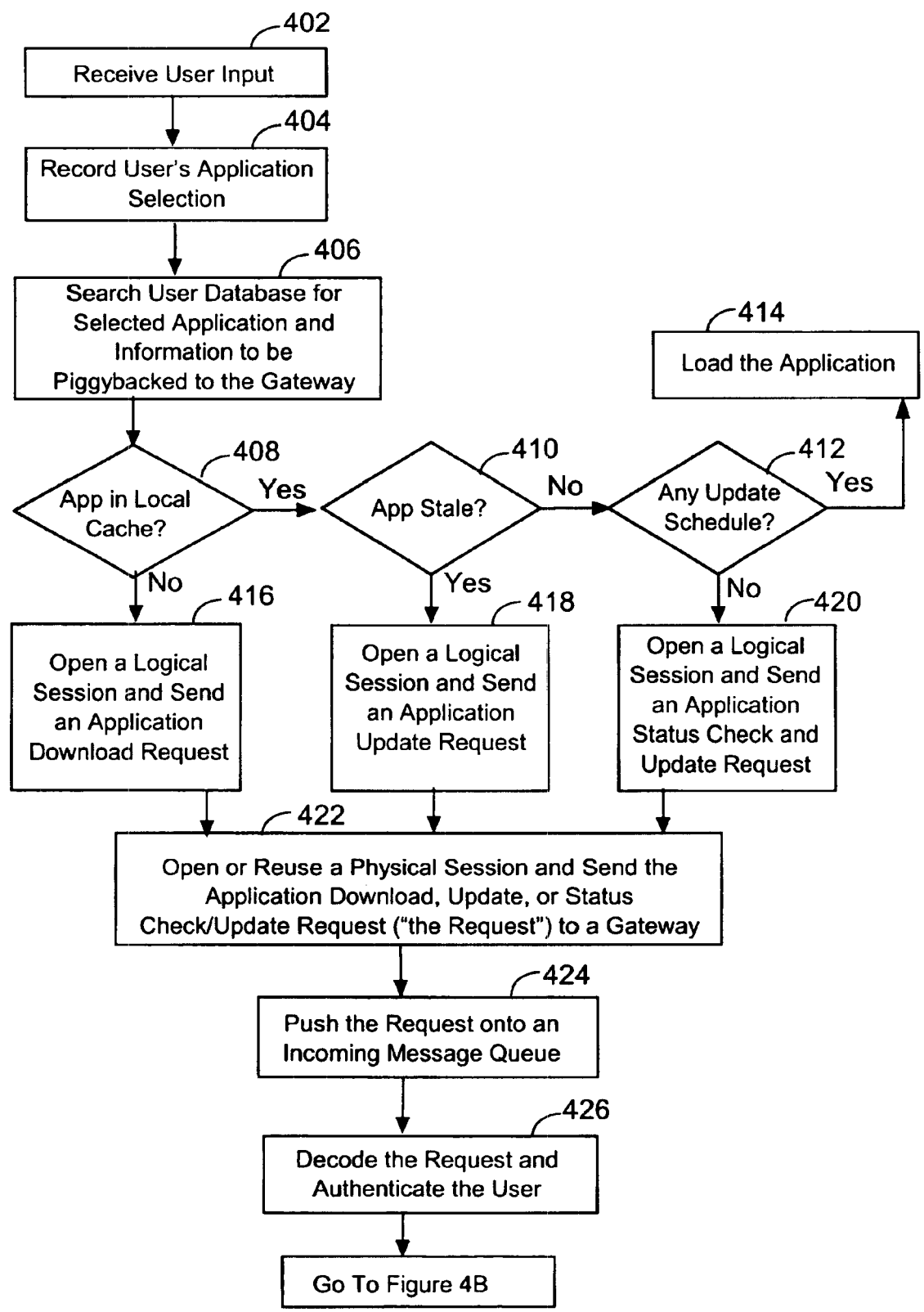
FIGS. 4A–4E illustrate another exemplary process in accordance with an embodiment of the invention.
Figure 4B:
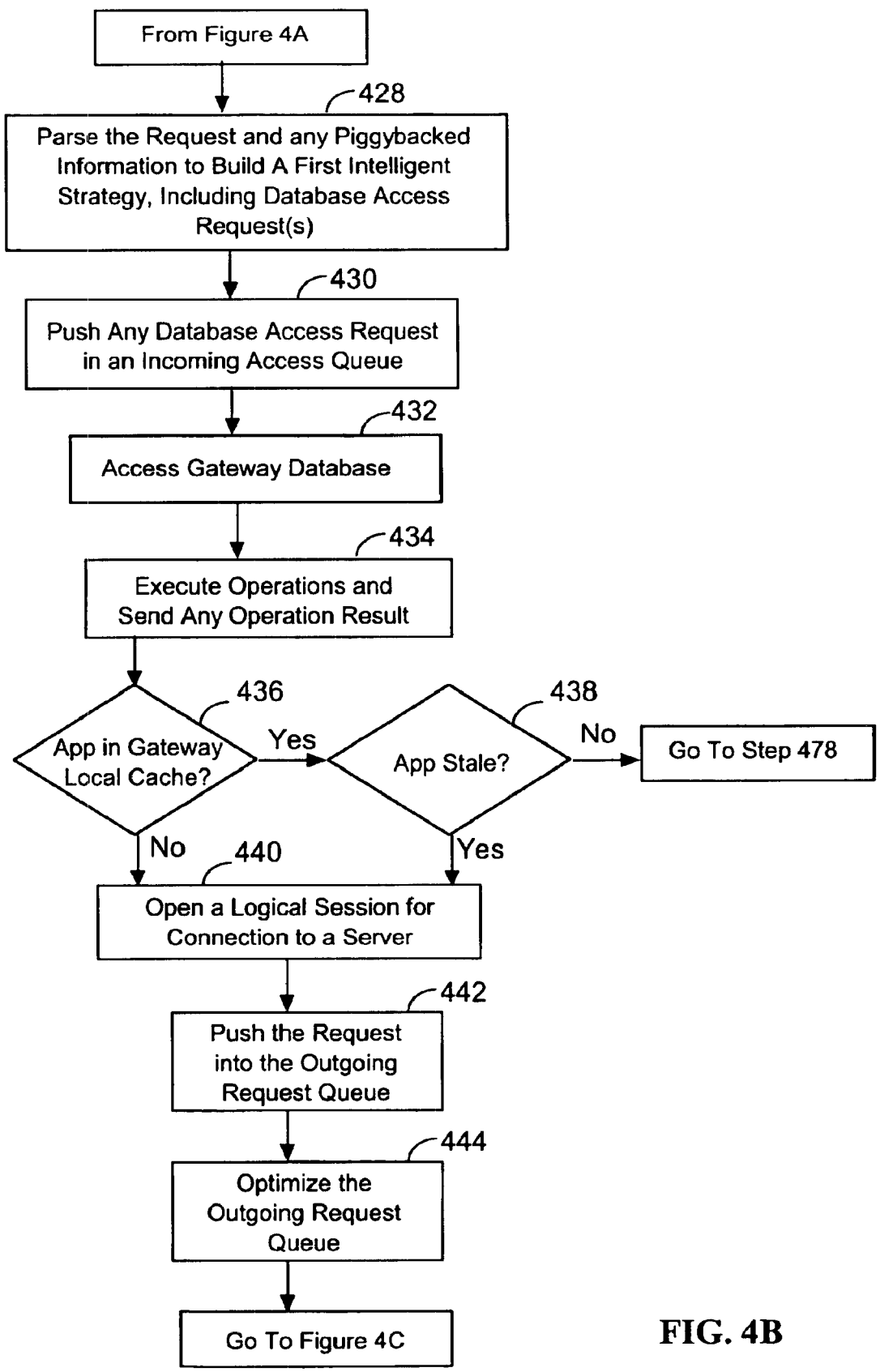

In FIG. 4B, the gateway SC 208 parses the Request and any piggybacked information to build a first intelligent strategy (step 428). In an exemplary embodiment, the gateway SC 208 intelligently determines whether the selected application is located in the gateway DB 202 or needs to be first downloaded from a server then cached on the gateway DB 202. In another embodiment, the gateway SC 208 also determines how much of a cached application should be updated. In an exemplary embodiment, the first intelligent strategy includes at least one database access request. At step 430, the gateway SC 208 passes any database access request to the DBQM 206 which pushes the request into the incoming access queue for the gateway DBM 204. In an exemplary embodiment, the database access request is pushed into the incoming access queue having the highest priority (step 430). The DBQM 206 eventually services the request and accesses the gateway DB 202 (step 432). Any necessary operations are executed in the gateway DB 202 and the results of the operations are passed to the gateway DBM 204 (step 434). Next, whether the application is located in the gateway DB 202 is determined (step 436). If the application is not in the gateway DB 202, the gateway SC 208 opens a logical session for connection to a server 102–106 (step 440). Referring back to step 436, if the application is located in the gateway DB 202, whether the stored application is out-of-date (or stale) is determined (step 438). If the stored application is out-of-date, the gateway SC 208 opens a logical session for connection to a server (102–106) to update the application (step 440). Referring back to step 438, if the stored application is up-to-date, then the process continues at step 478 in FIG. 4E. If a logical session for connection to a server is opened (step 440), the Request is passed to the MQM 210 which pushes the Request into the outgoing request queue (step 442). In an exemplary embodiment, the MQM 210 optimizes the outgoing request queue destined to a server (102–106) so that similar requests in the queue are integrated into a single request (step 444). The process continues in FIG. 4C.

Figure 4C:
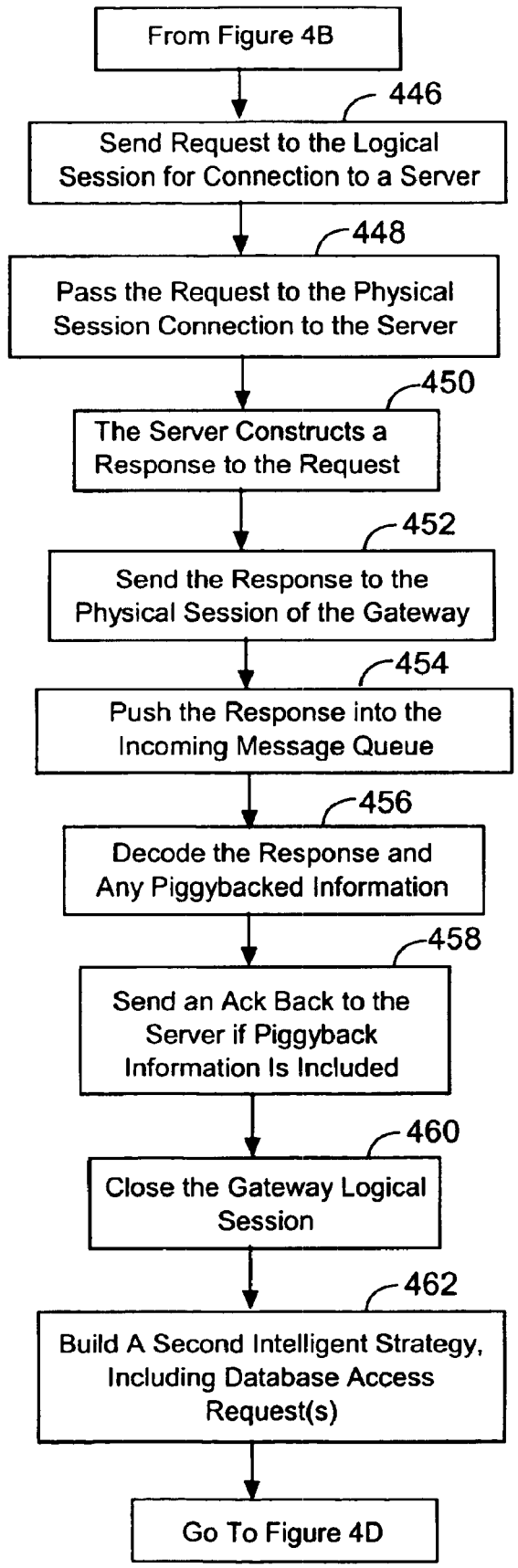

In FIG. 4C, the gateway MM 212 pulls the Request from the outgoing request queue and sends the Request to the logical session for connection to a server (102–106) (step 446). The Request is passed to the physical session connected to the server (102–106) (step 448). Via the physical session, the gateway 108 connects to a server that allows downloading of an up-to-date version of the application or an update of the application. The server constructs a response to the Request (step 450). In an exemplary embodiment, if the server is the 3i server 104, it may also piggyback other information, such as application update broadcast messages, in the response. In any event, the response is sent to the gateway MM 212 via the physical session (step 452). The gateway MM 212 passes the response to the MQM 210 which pushes the response into the incoming message queue (step 454). Eventually, the gateway SC 208 pulls the response from the incoming message queue and decodes the response, including any piggybacked information (step 456). If piggybacked information is included in the response, the gateway SC 208 sends an acknowledgment back to the 3i server 104 (step 458). The gateway SC 208 then closes the logical session for connection to the 3i server 104 (step 460) and builds a second intelligent strategy based on the decoded response (step 462). In an exemplary embodiment, the second intelligent strategy, which includes at least one database access request, based on the server response. The processes continues in FIG. 4D.

Figure 4D:
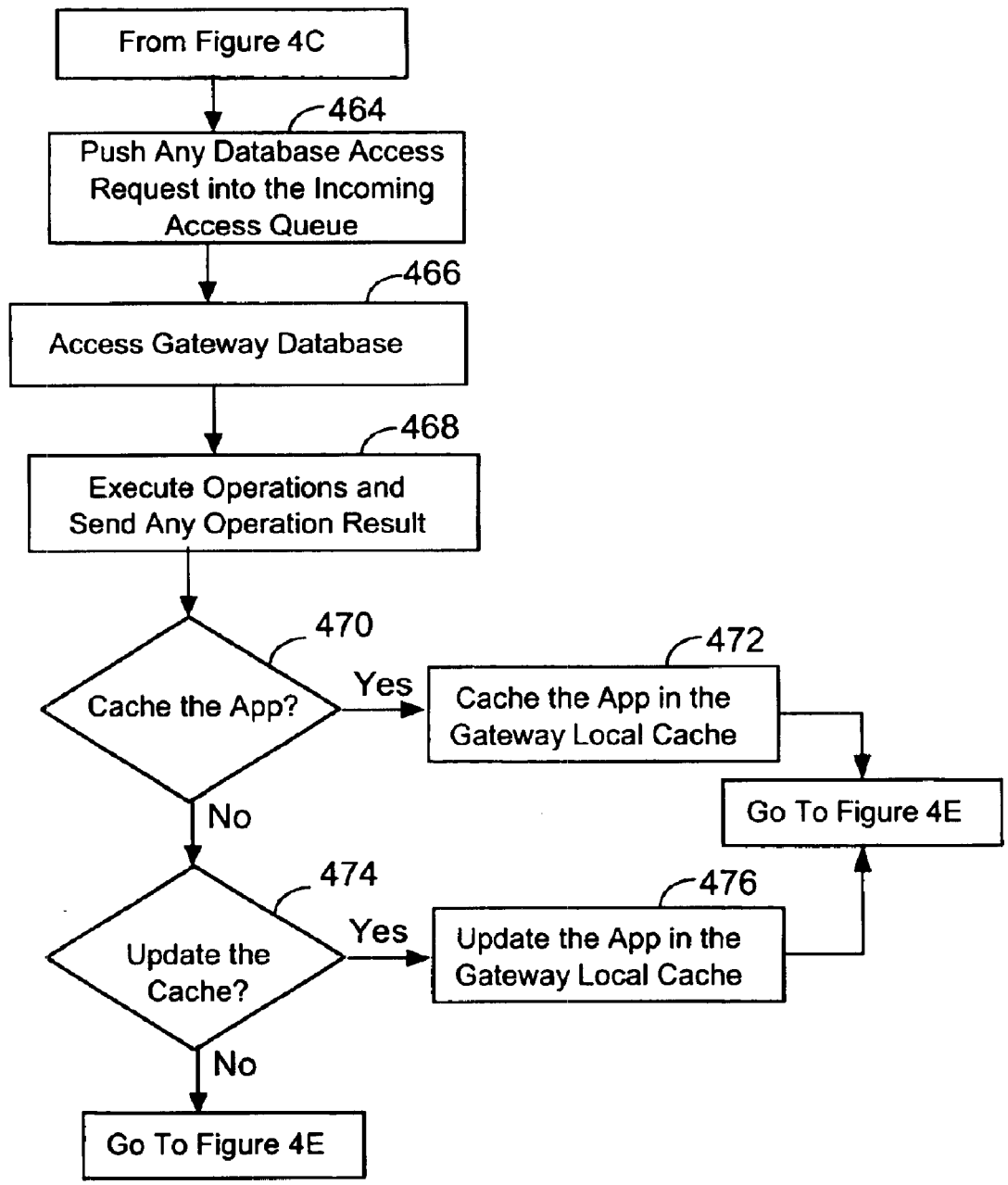

In FIG. 4D, any database access request is passed to the DBQM 206 which pushes the database access request into the incoming access queue for gateway DBM 204. In an exemplary embodiment, the database access request is pushed into the incoming access queue having the highest priority (step 464). The DBQM 206 eventually pulls the database access request from the incoming access queue and accesses the gateway DB 202 (step 466). Any necessary operations are executed in the gateway DB 202 and results of the operations are sent to the gateway DBM 204 (step 468). The gateway DBM 204, in turn, passes the results to the gateway SC 208. Based on the second intelligent strategy, the gateway SC 208 determines if the application should be cached in the gateway DB 202 or if an existing application in the gateway DB 202 should be updated (step 470). In an exemplary embodiment, the gateway SC 208 calculates a CBI for caching or updating each application. In an exemplary embodiment, each CBI is a function of the size of the application, the number of cached application or data, the size of free space available in the gateway DB 202, the frequency of access/update requests by users, and the average update rate on the application. If the gateway SC 208 determines that the application should be cached in the gateway DB 216 (step 470), the application is cached (step 472) and the process continues in FIG. 4E. If the gateway SC 208 determines that the application should not be cached because there is already an existing copy in the gateway DB 202, then the gateway SC 208 determines if that copy in the gateway DB 202 should be updated (step 474). If that copy should be updated, the application in the gateway DB 202 is so updated (step 476). In any event, the process continues in FIG. 4E. In an exemplary embodiment, a differential file is generated by the gateway SC 208 based on a comparison between an old version of the application stored in the gateway DB 202 and the new version. In this embodiment, the differential file may be sent to the mobile device 110 (instead of the entire file) when responding to an update request.

Figure 4E:
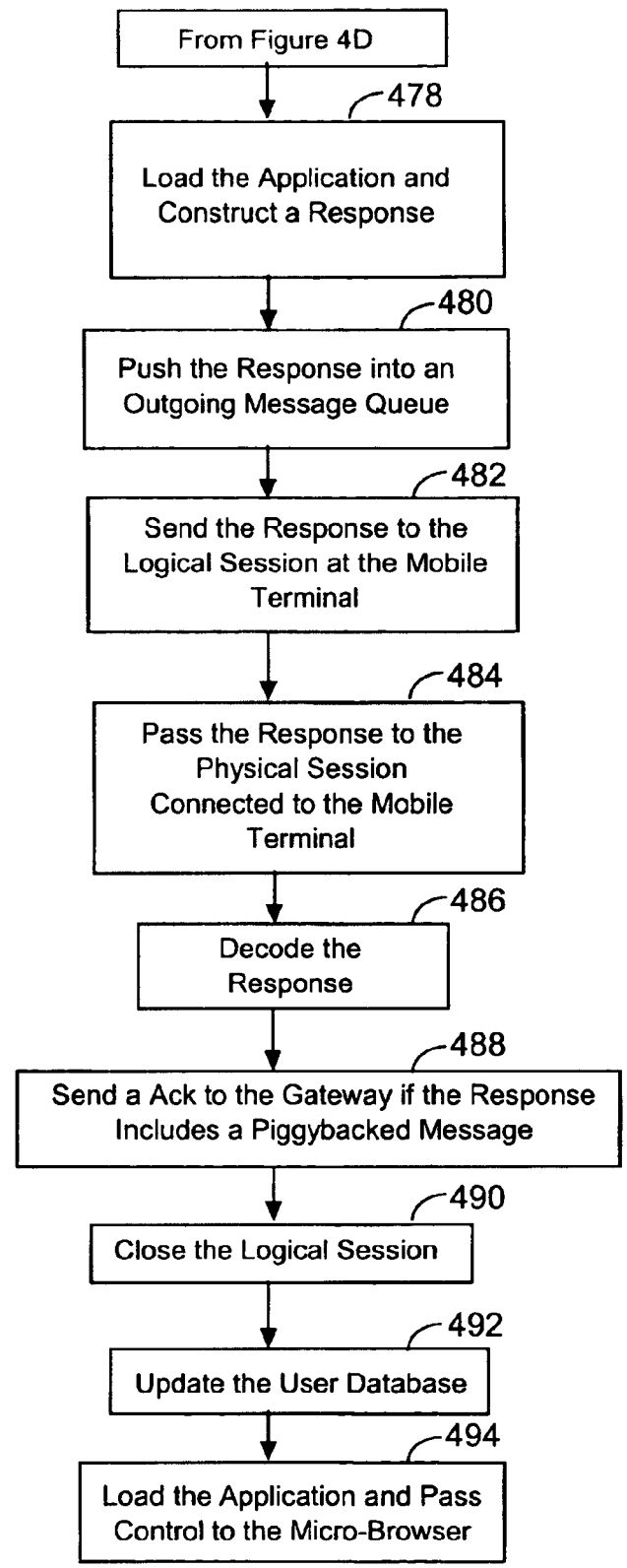

In FIG. 4E, the gateway SC 208 loads the newly stored or updated application from the gateway DB 202 and constructs a Response (i.e., an application download response, an application update response, or an application status check response) (step 478). The gateway SC 208 then passes the Response to the MQM 210 which pushes the Response into the outgoing message queue (step 480). In an exemplary embodiment, the gateway SC 208 may simply pass the response generated by a 3i server 104 to the MQM 210 instead of generating a new response. In any event, the gateway MM 212 eventually pulls the Response from the outgoing message queue and sends the Response to the logical session for connection to the mobile device 110 (step 482). The Response is sent to the mobile MM 224 via the physical session connected to the mobile device 110 (step 484). At the mobile device 110, the mobile MM 224 passes the Response to the mobile SC 222 that decodes the Response (step 486). If the Response includes any piggybacked information, the mobile SC 222 sends an acknowledgment to the gateway 108 (step 488). Next, the mobile SC 222 closes the logical session (step 490), updates the mobile DB 228 via the mobile DBM 230 (step 492), loads the application, and passes control to the micro-browser 218 (step 494).

From time to time, the mobile device 110 may initiate an update request to maintain the integrity of the applications/data cached in the mobile DB 228. If the mobile device 110 obtained an application/data from a 3i server 104, such updates are initiated based on broadcast notifications and scheduled updates received from the 3i server. In one embodiment, upon occurrence of a scheduled update or a receipt of a broadcast notification, the corresponding application/data is marked out-of-date. The actual update is initiated when a user attempts to execute or access that application/data. This way, the mobile device's 110 limited resources are not wasted. In another exemplary embodiment, if the mobile device 110 obtained an application/data from a general server 102, an update of that application/data is initiated only when a user attempts to execute or access that application/data. The difference here is that the mobile device 110 has no way of knowing from a general server 102 whether the application/data is out-of-date or not.

Similarly, from time to time, the gateway 108 may automatically initiate an update request to maintain the integrity of the applications/data cached in the gateway DB 202. In an exemplary embodiment, the gateway 108 obtained an application from a 3i server 104. In this case, an update request from the gateway 108 to the 3i server 104 may be initiated based on a broadcast notification received from the 3i server 104, an occurrence of a scheduled update, or an occurrence of an estimated update interval. In one embodiment, the 3i server 104 provides the gateway 108 with an update schedule for each application. Further, when a new version is generated, the 3i server 104 sends the gateway 108 a broadcast notification to update. The estimated update interval is calculated by the gateway 108 based on the past update history on the application/data. In another exemplary embodiment, the gateway 108 obtained an application from a general server 102 (e.g., a server that does not contain additional software). In this case, an update request from the gateway 108 is initiated based only on the occurrence of an estimated update interval calculated by the gateway 108.

Figure 5A:
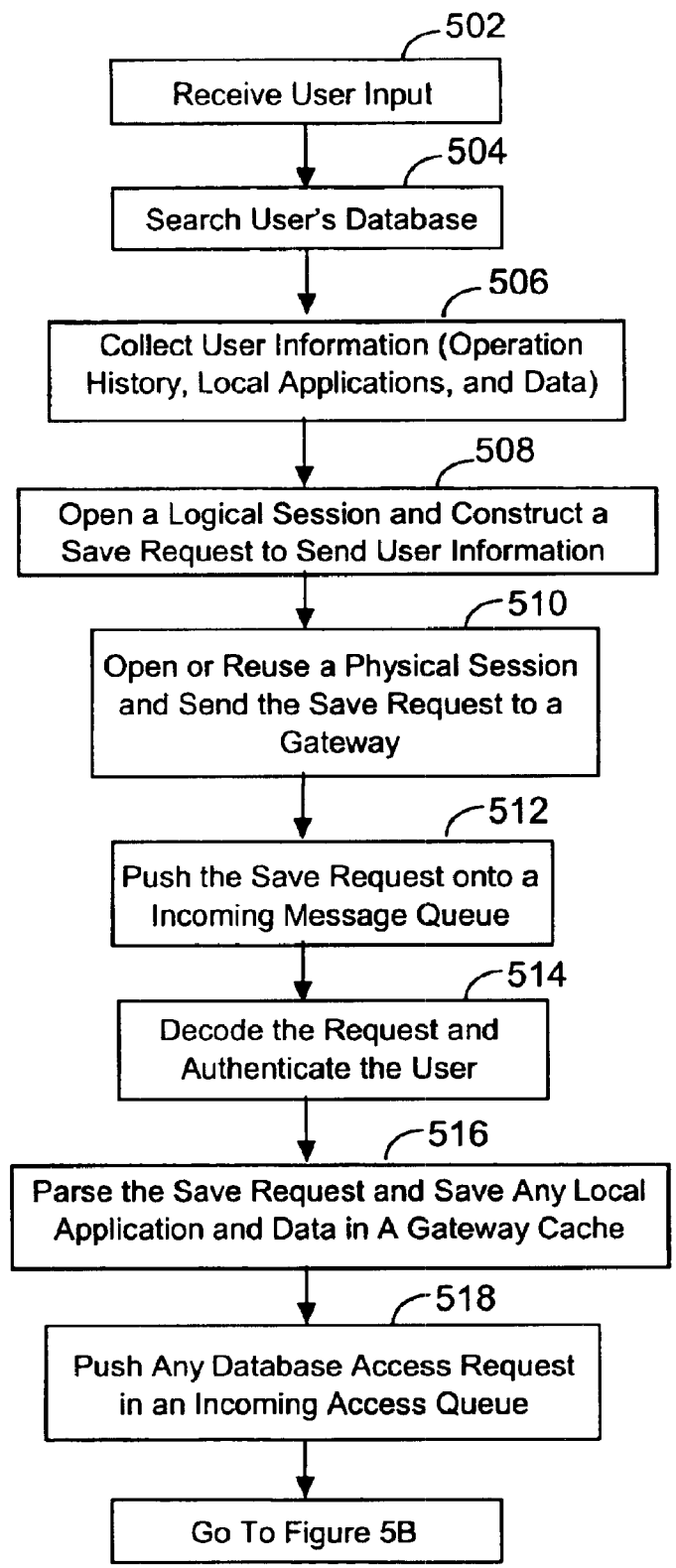
FIGS. 5A and 5B illustrate another exemplary process in accordance with an embodiment of the invention.
Figure 5B:
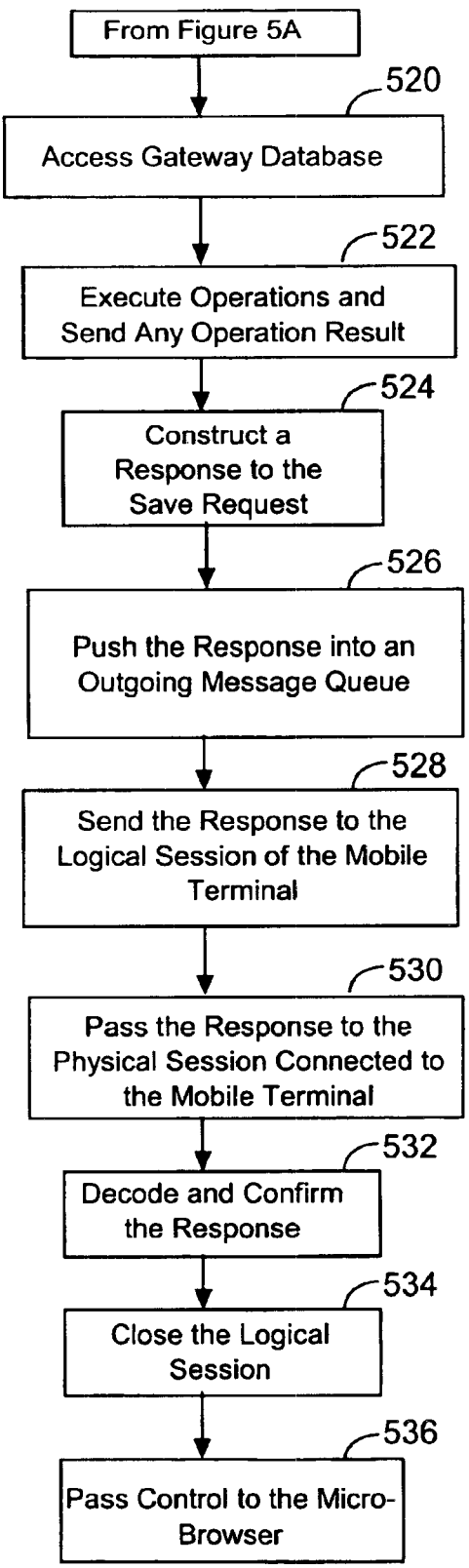
Figure 6A:
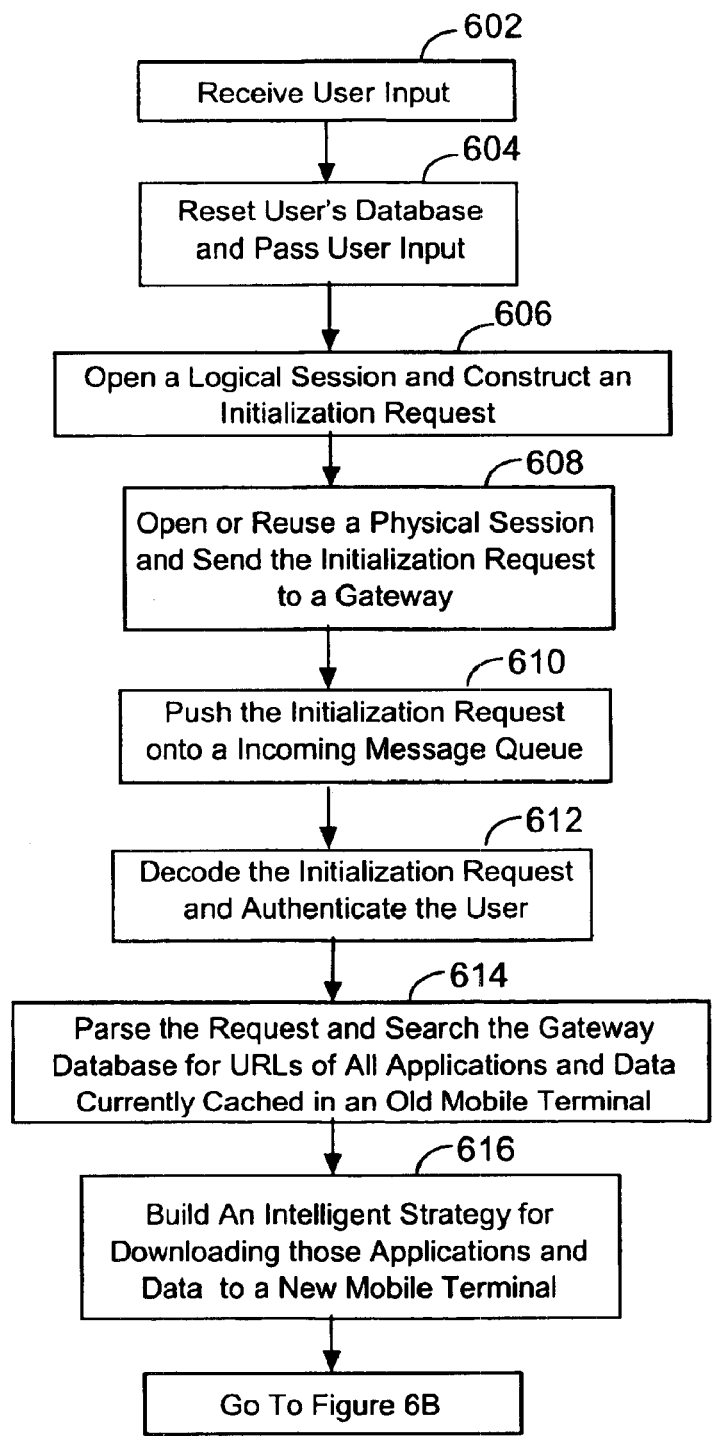
FIGS. 6A and 6B illustrate another exemplary process in accordance with an embodiment of the invention.
Figure 6B:
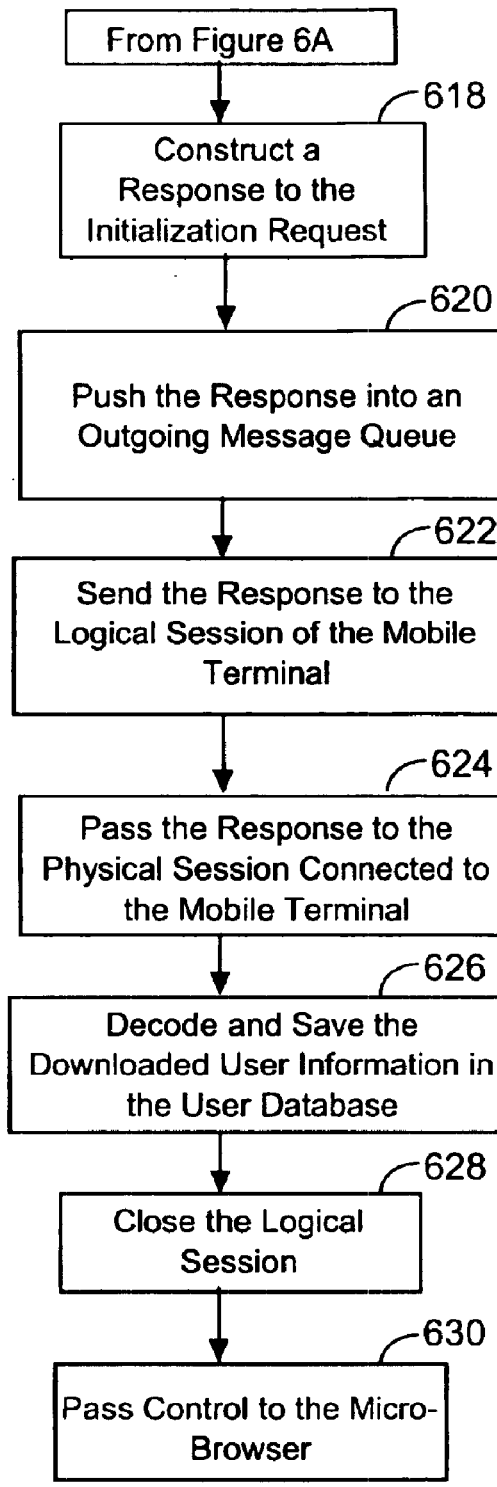

In an exemplary embodiment, a user who recently purchased a new mobile device may wish to transfer information (e.g., local application/data as well as a list of URLs for cached remote application/data) stored in an original mobile device to the new mobile device. In an exemplary embodiment, the user's local application/data and all the URLs of remote applications currently cached in the mobile DB 228 of the original mobile device 110 is first saved at a temporary cache at the gateway 108 and the gateway DB 202, respectively. When the user selects the initiation function at the new mobile device, the information (local applications/data and URLs of remote applications) is transferred from the gateway 108 to the new mobile device 110. The saving and transferring of the user's information are transparent to the user. FIGS. 5A–5B below illustrate an exemplary process for temporarily saving a copy of the user's information at the gateway 108 in accordance with an embodiment of the invention. FIGS. 6A–6B below illustrate an exemplary initialization process of a new mobile device 110.

In FIG. 5A, the user's request to save personal information at the gateway DB 202 is received by the micro-browser 218 (step 502). In response to the user's request, the mobile SC 222 searches the mobile DB 228 via the mobile DBM 230 (step 504) to collect user information (e.g., local application and data) and a list of URLs of all remote applications/data that are cached at the original mobile device (step 506). In one embodiment, the save request also includes other information, such as the unsent user operation history and changes on cached applications/data. Next, the mobile SC 222 opens a logical session, constructs a save request, including the user information, and sends the save request to the mobile MM 224 (step 508). In an exemplary embodiment, the save request includes update information such as new URLs of remote applications/data cached at the mobile device 110. The mobile MM 224 opens or reuses a physical session to send the save request to the gateway MM 212 (step 510). After receiving the save request, the gateway MM 212 passes the request to the MQM 210 which pushes the request into the incoming message queue (step 512). The gateway SC 208 eventually pulls the request from the incoming message queue, decodes the request, and authenticates the user (step 514). Next, the gateway SC 208 parses the save request to save the user information in a temporary cache and the list of URLs in the gateway DB 202 (step 516). If the save request includes piggybacked information, the gateway SC 208 constructs at least one database access request to update user information in the gateway DB 202 and passes the database access request to the DBQM 206. The DBQM pushes the database access request into the incoming access queue for the gateway DBM. In an exemplary embodiment, the database access request is pushed into the incoming access queue having the highest priority (step 518). The process continues in FIG. 5B.

In FIG. 5B, the DBQM 206 eventually pulls the database access request from the incoming access queue and accesses the gateway DB 202 (step 520). Any necessary operations are performed in the gateway DB 202 and results of the operations are sent to the gateway DBM 204 (step 522). In an exemplary embodiment, the gateway DBM 204 passes the results to the gateway SC 208. Based on the results, the gateway SC 208 constructs a response to the save request (step 524) and passes the response to the MQM 210 which pushes the response to the outgoing message queue (step 526). The gateway MM 212 eventually pulls the response from the outgoing message queue and sends the response to the logical session (step 528). The response is passed to mobile MM 224 via the physical session connected to the mobile device 110 (step 530). The mobile MM 224 passes the response to the mobile SC 222 which decodes and confirms the response (step 532). The mobile SC 222 closes the logical session (step 534) and passes control to the micro-browser 218 (step 536).

In FIG. 6A, a user inputs a request to initialize a new mobile device 110 (step 602). In response to the user request, the mobile DB 228 in the new mobile device 110 is reset and the user request is passed to the mobile SC 222 (step 604). The mobile SC 222 constructs an initialization request, opens a logical session, and sends the initialization request to the mobile MM 224 (step 606). The mobile MM 224 opens or reuses a physical session and sends the initialization request to the gateway MM 212 (step 608). The gateway MM 212 passes the initialization request to the MQM 210 which pushes the request into the incoming message queue (step 610). The gateway SC 208 eventually pulls the request from the incoming message queue, decodes the request, and authenticates the user (step 612). The gateway SC 208 searches the gateway DB 202 and the temporary cache for any URLs of remote applications and any local user application/data, respectively (step 614). Next, the gateway SC 208 builds an intelligent strategy for transferring such user information to the new mobile device (step 616). The process continues in FIG. 6B.

In FIG. 6B, the gateway SC 208 constructs a response to the initialization request (step 618). In an exemplary embodiment, the response includes local user applications/data cached in the temporary cache and the list of URLs of remote applications/data that were cached in the original mobile device. In one embodiment, the remote applications/data can be downloaded by the new mobile device via the exemplary process described in FIGS. 4A–4E for downloading applications/data. The response is passed to the MQM 210 which pushes the response into the outgoing message queue (step 620). The gateway MM 212 eventually pulls the response from the outgoing message queue and sends the response to the logical session (step 622). The response is passed to the mobile MM 224 via the physical session connected to the new mobile device 110 (step 624). The mobile MM 224 passes the response to the mobile SC 222 which decodes the response and saves the downloaded user information to the mobile DB 228 via the mobile DBM 230 (step 626). Next, the mobile SC 222 closes the logical session (step 628) and passes control to the microbrowser 218 (step 630).

FIG. 7 illustrates an exemplary embodiment of the load balancer 114 in accordance with the invention. The mobile devices (110A–110C) are connected to a base station 702. The base station 702 is connected to a home location registration (HLR) 704 and a switch center 708. The HLR 704 has access to a user location database 706. The switch center 708 is connected to the load balancer 114. The load balancer is connected to a subscriber ID database 710, a gateway information database 712, and gateways (108A–108C). The HLR 704 provides user location information by accessing the user location database 706. The switch center 708 provides switching services to determine whether a mobile device is serviced by available gateways. The subscriber ID database 710 includes information for converting user identification numbers (e.g., phone numbers) to subscriber identifications. The gateway information database 712 includes information about each gateway serviced by the load balancer 114, such as gateway name, gateway IP address, gateway location, etc.

Typically, each mobile device 110 is serviced by the geographically nearest gateway. Nearest geographical location can be ascertained by comparing the information provided by the HLR 704 and information in the subscriber ID database 710 and the gateway information database 712. Based on traffic and gateway conditions, the load balancer 114 may direct a mobile device 110 to a gateway that is not necessarily the nearest. In an exemplary embodiment, the load balancer 114 uses simple network management protocol (SNMP) agents to collect traffic volume information to each gateway and the CPU/memory payload at each gateway. Based on the traffic volume information and the CPU/memory payload at each gateway, the load balancer 114 may switch a mobile device from one gateway to another if the first gateway exceeds a configured threshold (e.g., 80%) of its capacity. In another example, the load balancer 114 switches a mobile device from one gateway to another gateway as the user leaves the service area of the first gateway. In yet another example, the load balancer 114 switches a mobile device from one gateway to another when the first gateway crashes. In an exemplary embodiment, the load balancer 114 includes a synchronization initiation module that permits synchronization among two or more gateways based on traffic volume at those gateways. Typically, the load balancer's 114 switching from one gateway to another is transparent to the user. In other words, the user is always serviced by a virtual gateway that is operating and/or most conveniently located.

Figure 8:
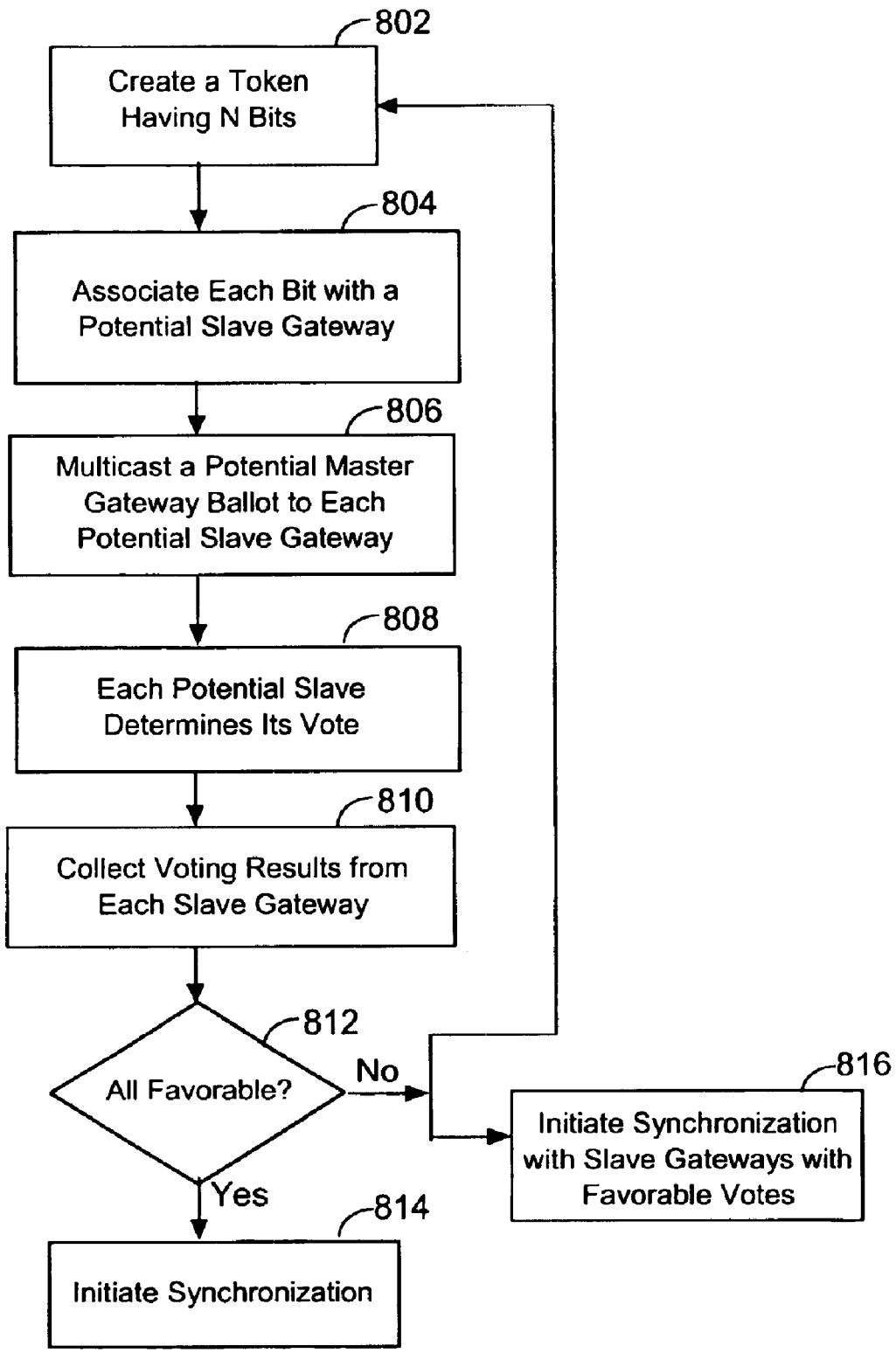
FIG. 8 illustrates an exemplary process in accordance with an embodiment of the invention.

In an exemplary embodiment, during a synchronization session, the gateway which contains the information to be transferred is the master gateway while all receiving gateways (one or more) are slave gateways. FIG. 8 illustrates an exemplary process for a gateway among N gateways to become the master gateway.

At step 802, a potential master gateway that wishes to perform a synchronization process creates a token that comprises N bits. Next, the potential master gateway associates each bit in the token with a unique potential slave gateway (step 804). The potential master gateway multicasts a master gateway ballot to each potential slave gateway (step 806). In one embodiment, each ballot includes a corresponding bit. Next, each potential slave gateway determines whether it will vote for the potential master gateway (step 808). For example, if a potential slave gateway is in an on-going synchronization process with other gateways, that potential slave gateway will vote against the potential master gateway by setting the received bit to 0. To vote for the potential master gateway, a slave gateway will set the received bit to 1. Next, the potential master gateway collects the voting results from all potential slave gateways (step 810). If the potential master gateway has favorable votes from all potential slave gateways (step 812), it becomes the master gateway and synchronization begins (step 814). If the potential master gateway receives one unfavorable vote from a potential slave gateway (step 812), it may choose to repeat the process at a later time or decide to only synchronize with the potential slave gateways that voted favorably (step 816).

In order to avoid a deadlock (e.g., when two or more gateways are attempting to become the master gateway at the same time and are both rejected), a potential master gateway may choose to repeat the process described in FIG. 8 at a random time.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A computerized method for intelligently providing application and data in a mobile device system, comprising the steps of:

collecting user operation history from at least one user;
   generating user and application registration information;

generating a list of frequently accessed information based on said user operation history;

selectively caching information at a mobile device and a gateway based on said list of frequently accessed information, said information including application or data;

updating said information at said mobile device and said gateway; and synchronizing said user operation history and said user and application registration information among a plurality of gateways wherein said selectively caching includes the steps of:

caching a first set of frequently accessed information of each user at a respective mobile device; and caching a second set of frequently accessed information at said gateway.

2. The method of claim 1, wherein said step of updating said information includes the steps of:

receiving a broadcast about a new version of said information;

checking a local cache for an old version of said information;

comparing said new version and said old version; and differentially updating portions of said information based on said comparing in response to a user event.

3. The method of claim 2, wherein said user event includes a user request to execute or access said old version.

4. The method of claim 1, wherein said step of updating said information includes the steps of:

performing a status check with a server;

downloading a new version from said server if said new version exists; and replacing an old version with said new version.

5. The method of claim 4, wherein said performing step includes the step of:

triggering said status check in response to a user event.

6. The method of claim 4, wherein said performing step includes the step of:

automatically triggering said status check in accordance with an estimated update interval.

7. The method of claim 1, wherein said step of updating said information includes the steps of:

receiving a broadcast about a new version of said information;

checking a local cache at said gateway for an old version of said information;

comparing said new version and said old version;

generating a differential file based on said comparing; and sending said differential file to said mobile device.

8. The method of claim 1, wherein said step of updating said information includes the steps of:

downloading a new version of said information from a server; and checking a local cache at said gateway for an old version of said information:

if said local cache includes said old version,
      comparing said old version and said new version;
      generating a differential file based on said comparing; and
      sending said differential file to said mobile device; and if said local cache does not include said old version,
      sending said new version to said mobile device.

9. The method of claim 8, wherein said downloading step includes the step of:
   triggering said downloading in response to a schedule.

10. The method of claim 8, wherein said downloading step includes the step of:
    automatically triggering said downloading in accordance with an estimated update interval.

11. The method of claim 1, wherein said step of synchronizing said information includes the steps of:
    inquiring a plurality of potential slave gateways about their availability for a synchronization process;
    receiving responses from said plurality of potential slave gateways;
    initiating said synchronization process if all of said plurality of potential slave gateways are available; and
    repeating said inquiring if not all of said plurality of potential slave gateways are available.

12. The method of claim 1, further comprising the steps of:
    monitoring activity at said mobile device and said gateway; and
    automatically routing said mobile device to another gateway when said gateway is overloaded, when said gateway crashed, or when a user at said mobile device moved out of an area serviced by said gateway.

13. The method of claim 12, wherein said automatically routing includes the step of:
    routing said mobile device to a geographically nearest functional gateway.

14. The method of claim 1, further comprising the steps of:
    saving local information from said mobile device in a temporary cache of said gateway;
    saving a list of uniform resource locators in a database of said gateway; and
    transferring said local information and a copy of said list to a new mobile device upon receiving an initiation request from said new mobile device.

15. The method of claim 14, further comprising the steps of:
    checking a local cache at said gateway for an application or data corresponding to items on said list of uniform resource locators;
    if said application or data is found in said local cache: sending said application or data to said new mobile device;
    if said application or data is not found in said local cache: downloading said application or data from a server; and sending said application or data from said server to said new mobile device.

16. The method of claim 1, further comprising the steps of:
    receiving a request to search for an application or data, said request including keywords;
    searching said information at said mobile device and said gateway based on said keywords; and
    generating a result based on said searching.

17. A computerized method for processing requests at a gateway, comprising the steps of:
    parsing a request, said request including user operation history;
    building a first intelligent strategy based on said parsing, said first intelligent strategy including at least one database access request;
    accessing a gateway database based on said first intelligent strategy;
    constructing a response based on said accessing; and
    sending said response to said mobile device;
    wherein said step of accessing a gateway database includes the steps of:
    determining whether a requested application or data is located in said gateway; and
    determining whether said requested application or data is current;
    sending said request to a server if said requested application or data is not located in said gateway or said requested application or data is not current;
    receiving a server response from said server;
    building a second intelligent strategy based on said server response; and
    caching or updating said requested application or data in said gateway in accordance with said second intelligent strategy;
    wherein said step of sending said request to a server includes the steps of:
    opening a logical session;
    opening or reusing a physical session for connection to said server; and
    sending said request to said server via said logical and physical sessions.

18. The method of claim 17, further comprising the steps of: parsing said server response; and sending an acknowledgment to said server if said server response includes any broadcast message.

19. A computer program product for intelligently providing application and data in a mobile device system, comprising:
    logic code for collecting user operation history from at least one user;
    logic code for generating user and application registration information;
    logic code for generating a list of frequently accessed information based on said user operation history;
    logic code for selectively caching information at a mobile device and a gateway based on said list of frequently accessed information, said information including application or data;
    logic code for updating said information at said mobile device and said gateway; and
    logic code for synchronizing said user operation history and said user and
    application registration information among a plurality of gateways;
    wherein said logic code for selectively caching includes the step of:
    logic code for caching a first set of frequently accessed information of each user at a respective mobile device; and
    logic code for caching a second set of frequently accessed information at said gateway.

20. The computer program product of claim 19, wherein said logic code for updating said information includes:
    logic code for receiving a broadcast about a new version of said information;
    logic code for checking a local cache for an old version of said information;

logic code for comparing said new version and said old version; and logic code for differentially updating portions of said information based on said comparing in response to a user event.

21. The computer program product of claim 20, wherein said user event includes a user request to execute or access said old version.

22. The computer program product of claim 19, wherein said logic code for updating said information includes:

logic code for performing a status check with a server;

logic code for downloading a new version from said server if said new version exists; and logic code for replacing an old version with said new version.

23. The computer program product of claim 22, wherein said logic code for performing includes:

logic code for triggering said status check in response to a user event.

24. The computer program product of claim 22, wherein said logic code for performing includes:

logic code for automatically triggering said status check in accordance with an estimated update interval.

25. The computer program product of claim 19, wherein said logic code for updating said information includes:

logic code for receiving a broadcast about a new version of said information;

logic code for checking a local cache at said gateway for an old version of said information;

logic code for comparing said new version and said old version;

logic code for generating a differential file based on said comparing; and logic code for sending said differential file to said mobile device.

26. The computer program product of claim 19, wherein said logic code for updating said information includes:

logic code for downloading a new version of said information from a server; and logic code for checking a local cache at said gateway for an old version of said information:

if said local cache includes said old version,
logic code for comparing said old version and said new version;
logic code for generating a differential file based on said comparing; and
logic code for sending said differential file to said mobile device; and if said local cache does not include said old version,
logic code for sending said new version to said mobile device.

27. The computer program product of claim 26, wherein said logic code for downloading includes:

logic code for triggering said downloading in response to a schedule.

28. The computer program product of claim 26, wherein said logic code for downloading includes:

logic code for automatically triggering said downloading in accordance with an estimated update interval.

29. The computer program product of claim 19, wherein said logic code for synchronizing said information includes:

logic code for inquiring a plurality of potential slave gateways about their availability for a synchronization process;

logic code for receiving responses from said plurality of potential slave gateways;

logic code for initiating said synchronization process if all of said plurality of potential slave gateways are available; and logic code for repeating said inquiring if not all of said plurality of potential slave gateways are available.

30. The computer program product of claim 19, further comprising:

logic code for monitoring activity at said mobile device and said gateway; and logic code for automatically routing said mobile device to another gateway when said gateway is overloaded, when said gateway crashed, or when a user at said mobile device moved out of an area serviced by said gateway.

31. The computer program product of claim 30, wherein said logic code for automatically routing includes:

logic code for routing said mobile device to a geographically nearest functional gateway.

32. The computer program product of claim 19, further comprising:

logic code for saving local information from said mobile device in a temporary cache of said gateway;

logic code for saving a list of uniform resource locators in a database of said gateway; and logic code for transferring said local information and a copy of said list to a new mobile device upon receiving an initiation request from said new mobile device.

33. The computer program product of claim 32, further comprising:

logic code for checking a local cache at said gateway for an application or data corresponding to items on said list of uniform resource locators;

if said application or data is found in said local cache:
logic code for sending said application or data to said new mobile device;

if said application or data is not found in said local cache:
logic code for downloading said application or data from a server; and
logic code for sending said application or data from said server to said new mobile device.

34. The computer program product of claim 19, further comprising:

logic code for receiving a request to search for an application or data, said request including keywords;

logic code for searching said information at said mobile device and said gateway based on said keywords; and logic code for generating a result based on said searching.

35. A computer executable program product for processing requests at a gateway, comprising:

logic code for parsing a request, said request including user operation history;

logic code for building a first intelligent strategy based on said parsing, said first intelligent strategy including at least one database access request;

logic code for accessing a gateway database based on said first intelligent strategy;

logic code for constructing a response based on said accessing; and logic code for sending said response to a mobile device;

wherein said logic code for accessing a gateway database includes:

logic code for determining whether a requested application or data is located in said gateway; and logic code for determining whether said requested application or data is current;

logic code for sending said request to a server if said requested application or data is not located in said gateway or said requested application or data is not current;

logic code for receiving a server response from said server;

logic code for building a second intelligent strategy based on said server response; and logic code for caching or updating said requested application or data in said gateway in accordance with said second intelligent strategy;

wherein said logic code for sending said request to a server includes:

logic code for opening a logical session;

logic code for opening or reusing a physical session for connection to said server; and logic code for sending said request to said server via said logical and physical sessions.

36. The computer program product of claim 35, further comprising: logic code for parsing said server response; and logic code for sending an acknowledgment to said server if said server response includes any broadcast message.

* * * * *